US007969979B2

(12) United States Patent
Fuchs et al.

(10) Patent No.: US 7,969,979 B2
(45) Date of Patent: Jun. 28, 2011

(54) DISTRIBUTION OF MULTICAST DATA TO USERS

(75) Inventors: Meir Fuchs, Modiin (IL); Guy Morag, Kochav-Yair (IL); Ido Goren, Herzelia (IL); Noam Amram, Gan-Haim (IL)

(73) Assignee: Runcom Technologies Ltd., Rishon Lezion (IL)

( * ) Notice: Subject to any disclaimer, the term of this patent is extended or adjusted under 35 U.S.C. 154(b) by 1014 days.

(21) Appl. No.: 10/574,240

(22) PCT Filed: Sep. 28, 2004

(86) PCT No.: PCT/IL2004/000903
§ 371 (c)(1),
(2), (4) Date: Jan. 11, 2007

(87) PCT Pub. No.: WO2005/032026
PCT Pub. Date: Apr. 7, 2005

(65) Prior Publication Data
US 2007/0211720 A1    Sep. 13, 2007

Related U.S. Application Data

(63) Continuation-in-part of application No. PCT/IL2004/000806, filed on Sep. 7, 2004, and a continuation-in-part of application No. PCT/IL2004/000805, filed on Sep. 7, 2004.

(30) Foreign Application Priority Data

Sep. 29, 2003  (IL) .......................................... 158158

(51) Int. Cl.
*H04L 12/28* (2006.01)
*H04N 7/167* (2011.01)
(52) U.S. Cl. ......... 370/390; 370/474; 380/239; 713/160

(58) Field of Classification Search .................. 370/342, 370/390, 347, 432; 455/412.2, 412.1; 707/201
See application file for complete search history.

(56) References Cited

U.S. PATENT DOCUMENTS
5,247,575 A    9/1993  Sprague et al.
(Continued)

FOREIGN PATENT DOCUMENTS
GB       2414635        11/2005
(Continued)

OTHER PUBLICATIONS

CISCO;"GPRS White Paper"; Retrieved from Internet:http://www.cisco.com/warp/public/cc/so/neso/gprs/gprs_wp.pdf; Retrieved on Aug. 22, 2001; p. 1-19.

(Continued)

*Primary Examiner* — Hassan Kizou
*Assistant Examiner* — Emmanuel Maglo
(74) *Attorney, Agent, or Firm* — Robert G. Lev; Michael Factor

(57) ABSTRACT

A method of multicasting a data file. The method includes transmitting a notification on an upcoming multicast transmission to a plurality of receivers (20) designated to receive the multicast transmission, tuning by at least one of the plurality of receivers (20) to one or more multicast channels, responsive to the notification, transmitting a data file, from a data server (42), on the one or more multicast channels, without the data server (42) receiving acknowledgements from the receivers (20) on whether they received the notification, determining receivers (20) designated to receive the multicast transmission that did not receive at least a portion of the data file; and attempting to deliver the data file to the determined receivers (20).

26 Claims, 4 Drawing Sheets

U.S. PATENT DOCUMENTS

| | | | |
|---|---|---|---|
| 5,319,705 A * | 6/1994 | Halter et al. | 705/54 |
| 5,361,402 A * | 11/1994 | Grube et al. | 455/67.11 |
| 5,400,403 A * | 3/1995 | Fahn et al. | 705/51 |
| 5,406,613 A | 4/1995 | Peponides et al. | |
| 5,541,927 A | 7/1996 | Kristol et al. | |
| 5,568,554 A * | 10/1996 | Eastlake, 3rd | 713/181 |
| 5,691,995 A | 11/1997 | Ikeda et al. | |
| 5,727,002 A | 3/1998 | Miller et al. | |
| 5,748,736 A * | 5/1998 | Mittra | 713/163 |
| 5,757,813 A | 5/1998 | Raith | |
| 5,774,668 A | 6/1998 | Choquier et al. | |
| 5,862,329 A | 1/1999 | Aras et al. | |
| 5,887,252 A | 3/1999 | Noneman | |
| 5,896,566 A | 4/1999 | Averbuch et al. | |
| 5,905,871 A | 5/1999 | Buskens et al. | |
| 5,978,368 A | 11/1999 | Hjelm et al. | |
| 5,987,137 A | 11/1999 | Karppanen et al. | |
| 6,014,089 A | 1/2000 | Tracy et al. | |
| 6,046,980 A | 4/2000 | Packer | |
| 6,104,709 A | 8/2000 | Rinchiuso et al. | |
| 6,104,929 A | 8/2000 | Josse et al. | |
| 6,108,706 A | 8/2000 | Birdwell et al. | |
| 6,115,754 A | 9/2000 | Landgren | |
| 6,122,483 A | 9/2000 | Lo et al. | |
| 6,141,347 A | 10/2000 | Shaughnessy et al. | |
| 6,144,651 A | 11/2000 | Rinchiuso et al. | |
| 6,157,963 A | 12/2000 | Courtright, II et al. | |
| 6,188,911 B1 | 2/2001 | Wallentin et al. | |
| 6,260,168 B1 | 7/2001 | Godoroja | |
| 6,269,080 B1 | 7/2001 | Kumar | |
| 6,320,873 B1 | 11/2001 | Nevo et al. | |
| 6,324,570 B1 | 11/2001 | Tonchev et al. | |
| 6,331,983 B1 | 12/2001 | Haggerty et al. | |
| 6,337,911 B1 * | 1/2002 | Dillon | 380/262 |
| 6,339,594 B1 | 1/2002 | Civanlar et al. | |
| 6,351,467 B1 * | 2/2002 | Dillon | 370/432 |
| 6,360,076 B1 | 3/2002 | Segura et al. | |
| 6,370,153 B1 | 4/2002 | Eng | |
| 6,445,717 B1 | 9/2002 | Gibson et al. | |
| 6,453,438 B1 | 9/2002 | Miller et al. | |
| 6,477,149 B1 | 11/2002 | Okanoue | |
| 6,553,540 B1 | 4/2003 | Schramm et al. | |
| 6,563,822 B1 * | 5/2003 | Aoki | 370/390 |
| 6,570,851 B1 * | 5/2003 | Koskelainen et al. | 370/231 |
| 6,640,248 B1 | 10/2003 | Jorgensen | |
| 6,728,878 B2 * | 4/2004 | Dillon | 713/160 |
| 6,741,575 B1 | 5/2004 | Zhang et al. | |
| 7,093,028 B1 * | 8/2006 | Shao et al. | 709/240 |
| 7,213,005 B2 * | 5/2007 | Mourad et | 705/64 |
| 7,289,500 B1 * | 10/2007 | Amlekar | 370/390 |
| 7,296,091 B1 * | 11/2007 | Dutta et al. | 709/245 |
| 7,424,661 B2 * | 9/2008 | Fujimoto | 714/749 |
| 2001/0032245 A1 * | 10/2001 | Fodor | 709/206 |
| 2002/0006801 A1 * | 1/2002 | Siren | 455/461 |
| 2002/0012327 A1 * | 1/2002 | Okada | 370/328 |
| 2002/0038441 A1 | 3/2002 | Eguchi et al. | |
| 2002/0039361 A1 | 4/2002 | Imamura et al. | |
| 2002/0066026 A1 | 5/2002 | Yau et al. | |
| 2002/0080755 A1 * | 6/2002 | Tasman et al. | 370/338 |
| 2002/0085536 A1 | 7/2002 | Rudrapatna | |
| 2002/0087623 A1 | 7/2002 | Eatough | |
| 2002/0099727 A1 * | 7/2002 | Kadyk et al. | 707/201 |
| 2002/0102967 A1 | 8/2002 | Chang et al. | |
| 2002/0106985 A1 | 8/2002 | Sato et al. | |
| 2002/0115454 A1 | 8/2002 | Hardacker | |
| 2002/0136407 A1 | 9/2002 | Denning et al. | |
| 2002/0138826 A1 | 9/2002 | Peterka | |
| 2002/0178221 A1 * | 11/2002 | Yaport et al. | 709/204 |
| 2002/0198013 A1 | 12/2002 | Panasik et al. | |
| 2003/0007499 A1 | 1/2003 | Rajahalme | |
| 2003/0021286 A1 | 1/2003 | Boscovic et al. | |
| 2003/0039225 A1 | 2/2003 | Casati et al. | |
| 2003/0046539 A1 | 3/2003 | Negawa | |
| 2003/0073453 A1 | 4/2003 | Basilier | |
| 2003/0100325 A1 | 5/2003 | Paila et al. | |
| 2003/0147392 A1 * | 8/2003 | Hayashi et al. | 370/390 |
| 2003/0163551 A1 | 8/2003 | Riordan | |
| 2003/0204603 A1 | 10/2003 | Buchanan | |
| 2004/0014489 A1 | 1/2004 | Miyachi et al. | |
| 2004/0017825 A1 * | 1/2004 | Stanwood et al. | 370/468 |
| 2004/0057376 A1 * | 3/2004 | Sasvari et al. | 370/230 |
| 2004/0125773 A1 | 7/2004 | Wilson et al. | |
| 2004/0187124 A1 | 9/2004 | Labelle | |
| 2004/0233907 A1 | 11/2004 | Hundscheidt et al. | |
| 2005/0030966 A1 * | 2/2005 | Cai et al. | 370/432 |
| 2005/0136906 A1 | 6/2005 | Azuma | |
| 2005/0283447 A1 * | 12/2005 | Xu et al. | 705/400 |
| 2006/0025123 A1 * | 2/2006 | Majmundar et al. | 455/419 |
| 2006/0089128 A1 | 4/2006 | Smith et al. | |
| 2006/0094410 A1 | 5/2006 | Cortegiano | |
| 2006/0166653 A1 * | 7/2006 | Xu et al. | 455/412.2 |
| 2007/0028099 A1 * | 2/2007 | Entin et al. | 713/163 |

FOREIGN PATENT DOCUMENTS

| | | |
|---|---|---|
| WO | WO 93/20637 | 10/1993 |
| WO | WO 03/019840 | 3/2003 |
| WO | WO 2004/079964 | 9/2004 |
| WO | WO 2006/012911 | 2/2006 |

OTHER PUBLICATIONS

GSM technical specification: "3rd Generation Partnership Project; Technical Specification Group Services and System Aspects; GPRS Service description; Stage 2; (Release 1997);"GSM Group; identified as 3GPP TS 03.60 V6.9.0 (Jun. 2001); Available from Internet: ftp://ftp.3gpp.org/Specs/2001-06/R1997/03_series/0360-690.zip; pp. 1-108.

Levinson M.,"The MIME Multipart/Related Content-type", Aug. 1998, available from Internet: http://www.ietf.org/rfc/rfc2387.txt?number=2387.

* cited by examiner

DISTRIBUTION OF MULTICAST DATA TO USERS

RELATED APPLICATIONS

This application is a national phase of PCT Application PCT/IL2004/00903 which is a continuation in part of PCT application PCT/IL2004/000805 filed Sep. 7, 2004 which designates the US and of PCT application PCT/IL2004/000806 filed Sep. 7, 2004 which designates the US, the disclosures of which are incorporated herein by reference.

FIELD OF THE INVENTION

The present invention relates generally to communication networks and particularly to methods of multicast transmission.

BACKGROUND OF THE INVENTION

Data transmission networks are used to provide different types of data. Some data, such as real time telephony, must be provided quickly, and it is acceptable if a small portion of the data is lost. For other types of data, such as executable programs and other files, an entire data file must be received without any loss. In the IP protocol suite, the UDP protocol is used for data requiring fast delivery, while TCP is used for data requiring reliable delivery (i.e., without any loss). In the TCP protocol, the receiver continuously transmits acknowledgements on the data it receives, and retransmissions are performed when data was not acknowledged.

When it is desired to provide the same data to many users, multicasting may be used, in order to reduce the bandwidth consumption. In multicasting, a single transmission is listened to by a plurality of receivers. It is generally not practical for each receiver to provide continuous acknowledgements of the multicast data directly to the transmitter. Various methods, such as described in U.S. Pat. No. 5,541,927 by Kristol, Paul and Sabnani and in U.S. Pat. No. 6,269,080 to Kumar, the disclosures of which are incorporated herein by reference, were suggested to reduce the number of acknowledgements transmitted to the transmitter, by designating one or more representative acknowledgement providers. In addition, it has been suggested, for example in U.S. Pat. No. 5,727,002, the disclosure of which is incorporated herein by reference, to use a NAK acknowledgement method, in which receivers send acknowledgements only for data they did not receive.

Generally, when a packet was not received by one or more of the receivers, the sender re-multicasts the packet to all the receivers. In some cases, however, when only a single receiver needs to receive a retransmission, the packet is transmitted to that receiver on a point-to-point connection, if such a connection is available.

Cellular phones can be used for receiving video clips and other data, in addition to their use for point to point telephone communication. Multicasting the data to the cellular phones or to other mobile stations allows efficient use of the available bandwidth, such that large amounts of data can be provided to the cellular phones without requiring prohibitive amounts of bandwidth. In some cases, users are required to subscribe to a multicast service if they desire to receive the data. Upon subscribing, the users receive a decoding key which they use in decoding the multicast data. The key may be changed periodically in order to prevent users terminating their subscription from being able to decode data transmitted after the end of their subscription period.

A user does not always want to subscribe for a service for a long duration. For example, in some cases it may be desired to allow users to pay for each piece of data they receive, separately. In order to provide a reliable service, it is important to bill clients only if they actually received the multicast data. In addition, in order to maximize revenues it is desired to maximize the number of users receiving the multicast data.

In some networks, most users are generally continuously listening to the multicast channel, such that a multicast message may be transmitted to the users, if desired, without previous notice. In other networks, however, the receivers are not continuously tuned onto the multicast channel and the receivers must be notified about the transmission in order to tune onto the channel at the designated time. Mobile stations, for example, are generally assigned a wireless channel only when the data is actually transmitted, in order to conserve battery power and bandwidth. In such networks, the data source generally transmits a notification message to the mobile stations, instructing them to tune onto the multicast channel.

U.S. Pat. No. 6,453,438 to Miller et al., the disclosure of which is incorporated herein by reference, describes a method for managing multicast of data to receivers on a receiver list. The receivers on the list are notified on the upcoming data transmission and are requested to reply as to whether they will receive the data. Receivers responding that they will not be able to receive the transmission are added to a recovery list. At a later time, an attempt is made to provide the data to the receivers on the recovery list.

The transmission of multicast data in a cell of a cellular network generally requires higher power transmission levels than unicast data, in order to allow for all the receivers in the cell to receive the data. Higher transmission power levels consume more system resources, especially in noise-budget cellular networks (e.g., CDMA).

U.S. Pat. No. 6,360,076 to Segura et al., the disclosure of which is incorporated herein by reference, describes a method of adjusting the transmission power to the locations of the receivers in the cell. Thus, the power and/or bandwidth consumption may be reduced when the receivers are located, for example, close to the transmitter.

U.S. patent publication 2003/0007499 to Rajahalme, the disclosure of which is incorporated herein by reference, suggests determining whether to use multicast, unicast or a combination of multicast and unicast (i.e., some users receive the data in a multicast transmission, others in a unicast transmission) in providing data to subscribers within a specific cell. According to the '499 publication, broadcasting to the whole cell uses a lot of power and usually requires a robust channel coding, because there is no feedback possibility for the receivers to indicate lost frames. The '499 publication states that the invention is based on the premise that the membership of the group communication is known when allocating radio resources for the group communication delivery.

The combination of multicast and unicast is suggested for use when it would be cheapest to deliver the data by multicast, but some of the group members are not able to receive the broadcast for one reason or another. In other words, the multicast group is handled as subgroups to which the multicast packet is delivered using different methods.

SUMMARY OF THE INVENTION

A general aspect of the present invention relates to using less than optimal measures for delivering multicast data to receivers and supplementing receivers that did not receive the multicast data properly in point to point unicast transmissions.

An aspect of some embodiments of the invention relates to multicasting a data file to a list of receivers, in a network in which receivers are not continuously tuned to a multicast transmission channel. The method includes transmitting a notification on an upcoming multicast session, for example including the channel on which the multicast will be transmitted, to the receivers and performing the multicast session thereafter without receiving acknowledgements for the notification. It is noted that a receiver that did not receive the notification will not be able to receive the multicast transmission. Not using any acknowledgement measures for the notification may result in a lower percentage of receivers that receive the data file during the multicast transmission. In accordance with the present invention, the cost of unicasting the file to a larger number of receivers, due to the fact that they did not receive the file during multicast, is preferred over the cost of receiving acknowledgements from each of the receivers, for receiving the notification.

Optionally, the notification is transmitted several times in order to minimize the chances of a receiver not receiving the notification due to sporadic noise or a transient problem in the receiver. Alternatively or additionally, the notification is transmitted with a high protection level (e.g., a strong FEC). When the receivers are cellular units, the receivers that do not receive the notification are generally shut off or not located in a serviced cell and in most cases would not be able to receive the multicast transmission even if they received the notification.

In some embodiments of the invention, the file is delivered to each of the receivers on the list using at most a single application layer unicast connection for acknowledgement of data reception and receiving data portions not received during the multicast transmission.

Optionally, beyond the single application layer unicast connection, no other transport layer (layer 4, e.g., TCP) connections are established for delivering the multicast file. In some embodiments of the invention, beyond the single application layer unicast connection, no other network layer (layer 3, e.g., IP) transmission is performed in relation to the delivery of the file.

In some of these embodiments, no acknowledgements (including negative acknowledgements) are transmitted during the data delivery. In some embodiments of the invention, the receivers cannot transmit acknowledgements unless a unicast connection is established between the receiver and a data server.

In some networks, receivers cannot transmit uplink messages to the transmitter while they are tuned onto the multicast channel. The switching between a multicast channel and a unicast channel required for uplink transmission is generally resource consuming and therefore it is desired to minimize the number of times a receiver switches between unicast and multicast channels. In addition, when there are a large number of receivers, it is desired to reduce the number of unicast connections established with the transmitter.

In some embodiments of the invention, the delivered file is encrypted with one or more keys. Optionally, the keys are provided to the receiver in a same unicast connection in which the receiver acknowledges receiving the entire data file and/or receives supplementary portions of the data file or the entire data file. Thus, the entire data file is provided to each of the users using a single unicast connection in addition to the multicast transmission.

Alternatively, the key is provided to at least some of the users in a unicast connection separate from the unicast connection used for acknowledgement and/or for data supplement. In accordance with this alternative, each receiver optionally uses at most two unicast connections to receive the data file and any data required for decoding the file. Optionally, no more than 10-20% of the receivers of the file use two unicast connections, while the remaining receivers use only a single unicast connection. The two unicast connections performed by some of the receivers are optionally performed consecutively without the receiver tuning onto the multicast channel between the unicast connections. This alternative is optionally used, for example, when the user reviews a portion of the received data before determining whether to view the rest of the data.

Optionally, beyond the two unicast connections and the multicast transmission, no other transport layer (layer 4, e.g., TCP) or even network layer (layer 3, e.g., IP) transmissions are performed in relation to the delivery of the file.

An aspect of some embodiments of the invention relates to multicasting a data file to a list of receivers, in which the file is delivered to each of the receivers on the list using at most a single application layer unicast connection for acknowledgement of data reception and receiving data portions not received during the multicast transmission.

An aspect of some embodiments of the invention relates to a method of multicast delivery of a data file to receivers. The method includes encoding the data file and providing one or more keys required for decoding the file only after the data is provided to the receiver. Providing the key only after the data is provided allows using the request for the key as an acknowledgment of receiving the file. In addition, providing the key only after the data transmission reduces the time available for users to illegally disseminate keys.

Optionally, some of the receivers are provided in advance with the one or more keys required for decoding, in order to reduce the load on a key server that provides the keys immediately after the multicast transmission. In some embodiments of the invention, the receivers that received the keys in advance are requested to acknowledge the receipt of the transmission at a later time (e.g., after 10-60 minutes), for billing purposes.

In some embodiments of the invention, the receivers that receive the keys in advance are selected at least partially randomly, so that it is not possible to plan ahead a scheme of receiving the file without acknowledging the receipt. Alternatively or additionally, the receivers that are provided with the keys before the multicast transmission are chosen based on their acknowledgment history. Optionally, a receiver that did not acknowledge receipt of a previous multicast transmission is not provided the keys before the multicast transmission. Alternatively, each receiver is given a reliability score and accordingly, the receivers that receive the keys in advance are chosen.

In some embodiments of the invention, a set of one or more keys sufficient for decoding the file as received by only some of the receivers is provided in advance to all the receivers or to all the receivers in a limited location. The one or more keys are optionally provided in a multicast transmission. Only receivers that need keys beyond those provided in advance will request the additional keys from the key server after receiving the file. In some embodiments of the invention, the receivers that require keys beyond those provided in advance, are receivers that change their location between the transmission of the keys and the transmission of the file and/or receivers that changed location during the transmission of the file. Alternatively or additionally, the receivers that require keys beyond those provided in advance, are receivers that received additional keys in advance (e.g., have permanent keys) or that receive supplementary keys in a unicast key transmission before the multicasting of the file.

In some embodiments of the invention, the data file multicast to users includes a non-encrypted preview portion and at least one encrypted portion. The user may view the preview portion and accordingly determine whether to request the key for the encrypted portion. In some embodiments of the invention, the at least one encrypted portion may include a plurality of portions and the user may determine, independently from each other, for which portions to request decryption keys. Optionally, the user may request the key for each portion at different times. Alternatively or additionally, the user may determine whether to request a key for one of the portions based on viewing one or more of the portions for which a key was previously received. Providing a plurality of portions together reduces the amount of signaling required for the delivery of the plurality of portions to the receivers.

An aspect of some embodiments of the invention relates to a method of multicast delivery of a data file to receivers. The method includes estimating one or more transmission parameter values required to provide the multicast data, on the average, to a percentage of receivers lower than 100% and using the estimated parameter value for multicast transmission. The receivers that statistically do not receive the data during the multicast transmission are optionally provided the data in supplementary unicast transmissions. The percentage of receivers for which the transmission parameters are adjusted is selected so that the cost of providing the supplementary data in unicast is lower than the extra cost required for adjusting the transmission parameters at a higher level. Optionally, the estimation is adjusted to a level of reception of between about 90-95% of the receivers.

The estimation is optionally performed before each transmission, based on the current conditions (e.g., number of receivers, locations of receivers, noise level) of the network. Alternatively or additionally, the estimation is performed based on predetermined tests and/or assumptions for a plurality of transmissions.

The transmission parameters optionally include the transmission power used, the amount of redundancy used in the transmission, the transmission rate and/or any other parameter that affects the energy per bit of the transmission.

An aspect of some embodiments of the invention relates to a method of providing encrypted data to a receiver. The data is optionally provided by a first mobile network service provider, while the key for decrypting the data is provided by a second mobile network service provider. The first service provider optionally does not allocate the IP address used to receive the data. In some embodiments of the invention, the data is provided through a different gateway GPRS support node (GGSN) than the GGSN through which the key is provided.

In some embodiments of the invention, the data is provided in a multicast data delivery.

An aspect of some embodiments of the invention relates to a method of receiving multicast data, in which receivers are notified on an upcoming multicast session and then determine whether to tune onto the multicast channel on which the data is provided. Allowing the receivers to view the notification on a multicast session as a recommendation, rather than an instruction, allows the notification to be provided without specifically identifying the exact group of receivers to which the notification is directed. Thus, for example, when a file is transmitted a second time for those receivers that did not receive the file the first time, there is no need to identify the receivers that are to receive the second transmission in the notification, or to have the other receivers receive the file a second time.

In addition, the user may be queried whether to receive the data file after the notification is received, or may otherwise program the receiver on which files to receive, without involving the data server in the process.

In some embodiments of the invention, the receiver manages a table that indicates the multicast groups to which the receiver is subscribed. The receiver table is optionally managed in addition to a subscriber list managed by a transmission controller that provides the multicast data. Upon receiving the notification, the receiver determines the group or groups to which the data file referred to by the notification belongs and consults the table to determine whether to receive the data file. Alternatively, the user is queried. In some embodiments of the invention, the table indicates what is to be done if the user does not provide an answer (e.g., the user is not near the receiver, the receiver is powered off). In some embodiments of the invention, the rules on whether to receive a file, query the user and/or not receive a file may depend on one or more external parameters not related to the transmission (e.g., the time, date, location of the mobile) and/or one or more internal parameters related to the transmission (e.g., file size, planned transmission rate, expected error rate).

An aspect of some embodiments of the invention relates to a method of transmitting multicast data in a cellular network, in which different cells have different bandwidth allocated for the multicast transmission. The data is optionally provided to each of the base stations of the cells at a substantially same rate, and each base station transmits a portion of the data that it can transmit using its available bandwidth for the multicast transmission and drops data packets which they cannot transmit on their allocated bandwidth. The dropping of the packets is performed in a manner which substantially synchronizes the transmission of the non-dropped data packets of different base stations, such that the base stations transmit packets representing the same data content at substantially the same time. The term substantially synchronized refers herein to a gap of at most several packets (e.g., 5, 3 or even only 2 packets) between the packets transmitted by different base stations and/or a time gap of at most a few seconds (e.g., 10, 5 or even only 3 seconds) between the transmission of the same packet by different base stations.

Synchronizing the data transmission in the different cells, avoids the possibility of a mobile station moving from one cell to another during a multicast session, receiving the same data packets twice.

In some embodiments of the invention, the data packets are provided in groups and when a first packet of a new group is received, the base stations drop all the data they have of an old group. Optionally, the data source periodically transmits synchronization messages to the base stations, to keep the base stations synchronized. Alternatively or additionally, the base stations are configured to have small buffers and when the buffers are fall, packets are dropped. In an exemplary embodiment of the invention, the buffers of the base stations have a small size, for example of up to five packets (e.g., 2 or 3 packets), such that synchronization is maintained. Optionally, the buffers of substantially all the base stations have the same size.

In some embodiments of the invention, the data packets transmitted to the base stations are identical. Alternatively, different data packets, representing the same data content, are transmitted to different base stations.

An aspect of some embodiments of the invention relates to a method of multicasting a multimedia file to receivers. The method includes splitting the multimedia file into a plurality of sub-files of different media types (e.g., video, audio, images, rich text) and transmitting each sub-file in a separate multicast session. A multicast session refers herein to a continuous time-bounded transmission on a specific multicast channel. In some embodiments of the invention, each sub-file is transmitted on a separate multicast channel, so that receivers that automatically receive all messages transmitted on the channels to which they are tuned do not unnecessarily receive unneeded sub-files. The receivers receive the sub-files and optionally reconstruct the multimedia file before it is provided to an application to which the multimedia file is directed.

Two concurrent transmissions are on separate multicast channels if a receiver can receive one of the transmissions without receiving the other. In some embodiments of the invention, different multicast channels have different IP destination addresses. Alternatively or additionally, different multicast channels are transmitted on different physical channels (e.g., different time slots, different frequencies, different codes).

In some embodiments of the invention, one or more of the sub-files is transmitted in a plurality of different formats, in order to allow compatibility with a range of different receivers. Optionally, each different format of the sub-file is transmitted on a different multicast channel, and each receiver tunes onto a channel carrying the sub-file in a format that it supports. When different receivers have different combinations of file formats that they support, transmitting the sub-files separately reduces the number of separate channels required for the transmission of the multimedia file.

There is therefore provided in accordance with an exemplary embodiment of the invention, a method of multicasting a data file, comprising transmitting a notification on an upcoming multicast transmission to a plurality of receivers designated to receive the multicast transmission, tuning by at least one of the plurality of receivers to one or more multicast channels, responsive to the notification, transmitting a data file, from a data server, on the one or more multicast channels, without the data server receiving acknowledgements from the receivers on whether they received the notification, determining receivers designated to receive the multicast transmission that did not receive at least a portion of the data file and attempting to deliver the data file to the determined receivers.

Optionally, transmitting the notification comprises transmitting on a multicast or broadcast channel. Optionally, transmitting the notification comprises transmitting a unicast notification to each of the receivers on the designated receivers. Optionally, transmitting the notification comprises transmitting substantially only to designated receivers. Optionally, transmitting the notification comprises transmitting a message open also to non-designated receivers. Optionally, the notification indicates the channel on which the multicast transmission will be provided. Optionally, tuning to the multicast channel by at least one of the receivers comprises determining by each receiver that receives the notification whether to tune onto the multicast channel. Optionally, determining by each receiver that receives the notification whether to tune onto the multicast channel comprises determining, from the notification, a group to which the upcoming multicast transmission belongs and determining whether to tune onto the multicast channel according to the determined group.

Optionally, at least one of the receivers requests the one or more keys after receiving the data file and at least one of the receivers is provided with one or more of the keys before the transmission. Optionally, determining by each receiver that receives the notification whether to tune onto the multicast channel comprises determining by consulting a list stored on the receiver. Optionally, determining by each receiver that receives the notification whether to tune onto the multicast channel comprises determining based on input received from a user responsive to the notification. Optionally, the receivers do not transmit acknowledgements of reception of the notification, at all. Optionally, the receivers cannot transmit uplink messages to the data server, without stopping to listen to the multicast channel. Optionally, attempting to deliver the data file comprises delivering the data file in a unicast transmission to each of the determined receivers. Optionally, attempting to deliver the data file comprises delivering the data file in a multicast transmission to a plurality of the determined receivers.

Optionally, attempting to deliver the data file comprises providing a notification message inviting the receivers to download the transmission on a unicast connection, to the determined receivers. Optionally, at least 80% of the designated receivers establish only a single unicast connection related to receiving the data file. Optionally, substantially all of the designated receivers establish only a single unicast connection related to receiving the data file. Optionally, substantially all of the designated receivers establish up to two single unicast connections related to receiving the data file. Optionally, at least a portion of the data file is encrypted, requiring one or more decryption keys identified in the transmitted data file.

Optionally, the receivers request the one or more keys after receiving the data file. Optionally, the receivers request the one or more keys after determining that they received sufficient data to allow reconstruction of the data file. Optionally, the keys are received on a single unicast connection along with any supplementary data required, not received during the multicast transmission. Optionally, the method includes receiving acknowledgements from receivers that received the notification or at least a portion of the data file, after transmitting the data file, wherein determining receivers designated that did not receive at least a portion of the data file is performed by determining receivers from which acknowledgments were not received.

Optionally, receiving the acknowledgements comprises receiving a request for decryption keys. Optionally, receiving the acknowledgements comprises receiving a request for supplementary data not received during the multicast transmission. Optionally, receiving the acknowledgements comprises receiving over a different network than the network on which the data file was multicast. Optionally, the data file includes a non-encrypted preview portion. Optionally, the non-encrypted preview portion is transmitted on the multicast channel interleaved with the remaining portion of the data file. Optionally, at least one occurrence of the non-encrypted preview portion is transmitted on the multicast channel before transmission of the remaining portion of the data file.

Optionally, tuning onto the multicast channel comprises tuning onto a cellular multicast channel. Optionally, tuning onto the multicast channel comprises tuning onto a digital video broadcast channel. Optionally, attempting to deliver the data file to the determined receivers comprises delivering on a different network than the network on which the data file was multicast. Optionally, the notification indicates a plurality of categories to which the data file relates and the plurality of receivers comprises receivers designated to receive data belonging to different ones of the plurality of categories.

Optionally, transmitting the data file comprises transmitting a plurality of sub-files in a plurality of separate transmission sessions, for example on a plurality of different channels.

There is further provided in accordance with an exemplary embodiment of the invention, a method of receiving a data file provided in a multicast transmission, comprising tuning, by a mobile station, onto a multicast channel, receiving at least one encrypted packet which can be used in reconstructing the data file, on the multicast channel and receiving at least one key required for decrypting the at least one packet after receiving the packet.

Optionally, receiving the at least one encrypted packet comprises receiving a plurality of encrypted packets. Optionally, the plurality of encrypted packets require at least two different keys for decryption. Optionally, the at least one key is received after receiving a sufficient number of packets for reconstructing the data file. Optionally, the method includes requesting the at least one key after receiving a sufficient number of packets for reconstructing the data file and wherein receiving the at least one key is performed responsive to the requesting.

Optionally, the requesting of the at least one key is performed responsive to a user instruction. Optionally, at least a portion of the data file is not encrypted. Optionally, the user instruction is received after displaying the non-encrypted portion of the file to the user.

Optionally, the non-encrypted portion of the file is received before any encrypted portion of the data file. Optionally, the user instruction is received before receiving any encrypted portion of the data file. Optionally, the user instruction is received after receiving at least some of the encrypted packets. Optionally, the file includes a plurality of different portions requiring different keys for decryption. Optionally, the keys required for at least one portion are received after displaying at least one other portion. Optionally, the keys required for at least one portion are received after displaying at least one other portion which was decrypted.

Optionally, tuning onto the multicast channel is performed responsive to receiving a notification on an upcoming multicast transmission and responsive to a determination that the upcoming multicast transmission matches a subscription profile of the receiver. Optionally, the determination that the upcoming multicast transmission matches a subscription profile of the receiver comprises consulting a multicast subscription profile stored on the receiver. Optionally, the determination that the upcoming multicast transmission matches a subscription profile of the receiver comprises consulting a multicast subscription profile stored on the receiver which is configured automatically by instructions from a remote unit. Optionally, the determination that the upcoming multicast transmission matches a subscription profile of the receiver comprises consulting a multicast subscription profile stored on the receiver which is configured by a user of the receiver. Optionally, the method includes acknowledging receipt of the at least one key, in a manner which allows charging for the data file.

There is further provided in accordance with an exemplary embodiment of the invention, a method of multicasting a file, comprising encrypting the file using one or more keys, transmitting the encrypted file to a plurality of receivers in a multicast transmission and providing at least one of the plurality of receivers with one or more decryption keys required for decrypting the transmitted encrypted file, after the file was transmitted.

Optionally, the method includes providing at least one of the receivers with at least one decryption key for the encrypted file, before transmitting the encrypted file. Optionally, the method includes receiving from the at least one receivers provided with the decryption keys before transmitting the encrypted file, acknowledgement messages. Optionally, the acknowledgement messages are received at least 10 minutes after the transmission of the encrypted file is completed. Optionally, the at least one of the receivers provided with the decryption keys before transmitting the encrypted file are selected at least partially responsive to previous behavior of the receivers.

Optionally, the method includes broadcasting in at least one cell, one or more decryption keys of the encrypted file as multicast in the cell, wherein the broadcast decryption keys are encrypted using decryption keys of the file as multicast in one or more other cells. Optionally, the at least one of the receivers provided with the decryption keys before transmitting the encrypted file are selected at least partially responsive to the number or percentage of acknowledgements provided by the receivers in a given period.

Optionally, the at least one receivers provided with the decryption keys before transmitting the encrypted file are selected at least partially randomly. Optionally, the at least one receivers provided with the decryption keys before transmitting the encrypted file include all the receivers serviced by at least one base station. Optionally, the number of receivers provided with the decryption keys before transmitting the encrypted file is determined at least partially responsive to the total number of receivers expected to receive the encrypted file.

There is further provided in accordance with an exemplary embodiment of the invention, a method of transmitting multicast data, comprising estimating one or more transmission parameter values required to achieve, on the average, a reception rate of the multicast data lower than 100%, by the receivers to which the multicast data is directed, transmitting the multicast data on a multicast channel, using the one or more estimated parameter values, and providing at least supplementary portions of the multicast data to receivers that did not receive the multicast data in its entirety in transmitting the multicast data on the multicast channel.

Optionally, providing at least supplementary portions comprises transmitting the supplementary portions over a unicast connection. Optionally, the one or more transmission parameters comprise a transmission power level and/or a FEC redundancy level. Optionally, estimating the one or more transmission parameter values comprises estimating based on general network data without relation to specific conditions of a current transmission. Optionally, estimating the one or more transmission parameter values comprises estimating based on specific conditions of a current transmission. Optionally, estimating the one or more transmission parameter values comprises estimating based on the number of receivers. Optionally, the multicast channel comprises a data channel of a cellular network.

There is further provided in accordance with an exemplary embodiment of the invention, a method of receiving multicast data in a cellular network, comprising establishing, by a mobile station, a data channel, through a first network unit of a first mobile network, opening, by the mobile station, a port associated with the data channel, and receiving, by the mobile station, through the port, multicast data from a multicast channel passing through a second network element, belonging to a second mobile network different from the first mobile network.

Optionally, establishing the data channel comprises receiving an IP address for the mobile station and/or establishing a packet data context. Optionally, the first and second network elements comprise gateway GPRS support nodes GGSNs. Optionally, the method includes receiving a key for decrypting the multicast data through the first network element.

There is further provided in accordance with an exemplary embodiment of the invention, a method of transmitting multicast data in a cellular network, comprising providing data for multicast transmission to a plurality of base stations having different bandwidth amounts allocated for multicast transmission, at a same rate, dropping data by one or more of the base stations, as required, so that the data can be transmitted by each of the base stations on its respective allocated bandwidth for multicast transmission and transmitting the non-dropped data such that the data is transmitted by all the base stations substantially synchronously.

Optionally, the base stations use a small buffer for the provided multicast data.

There is further provided in accordance with an exemplary embodiment of the invention, a method of transmitting multicast data in a cellular network, comprising transmitting a notification on an upcoming transmission of a multicast file, stating a plurality of categories to which the data file relates and tuning on to a multicast channel by a plurality of receivers subscribed to different categories, responsive to the notification.

There is further provided in accordance with an exemplary embodiment of the invention, a method of transmitting multicast data in a cellular network, comprising providing a multimedia file, splitting the multimedia file into a plurality of portions relating to different media types, generating for each of the portions at least one sub-file and transmitting the plurality of sub-files in respective separate multicast sessions.

Optionally, the method includes receiving for each of the portions at least one sub-file, by at least one receiver, reconstructing the multimedia file from the received sub-files by the at least one receiver and providing the reconstructed multimedia file to an application running on the receiver, which is to provide the multimedia file to a user.

The method optionally includes generating for at least one of the portions a plurality of sub-files in different formats. Optionally, transmitting the plurality of sub-files in respective separate multicast sessions comprises transmitting on separate multicast channels.

There is further provided in accordance with an exemplary embodiment of the invention, a data server, comprising an input interface for receiving files to be multicast, an output interface for providing signals for transmission to receivers; and a controller adapted to generate a notification on an upcoming multicast transmission responsive to a received file, to provide the notification through the output interface for transmission and to provide the received file for transmission, without receiving acknowledgements from the receivers on whether they received the notification, to determine receivers designated to receive the multicast transmission that did not receive at least a portion of the data file and to attempt to deliver the data file to the determined receivers.

There is further provided in accordance with an exemplary embodiment of the invention, a mobile station, comprising a receiver and a processor adapted to tune the receiver to receive data on a plurality of multicast channels and to combine the data received on the plurality of channels into a single multimedia file. Optionally, the data received on the plurality of channels comprises different multimedia types on different channels.

BRIEF DESCRIPTION OF FIGURES

Particular non-limiting embodiments of the invention will be described with reference to the following description of embodiments in conjunction with the figures. Identical structures, elements or parts which appear in more than one figure are preferably labeled with a same or similar number in all the figures in which they appear, in which.

DETAILED DESCRIPTION OF EMBODIMENTS

Figure 1:
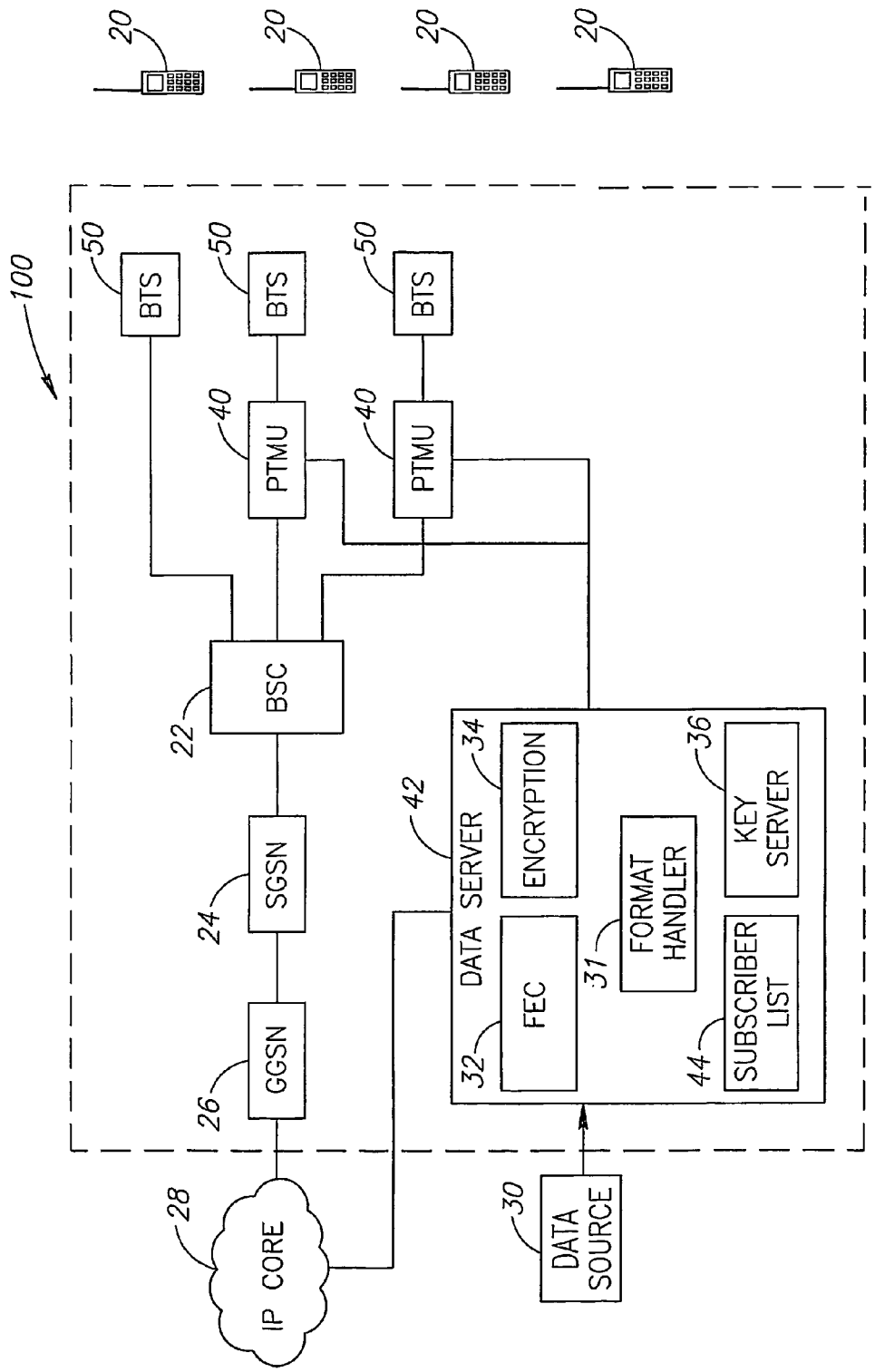
FIG. 1 is a schematic illustration of a cellular network, in accordance with an exemplary embodiment of the present invention.

FIG. 1 is a schematic illustration of a cellular network 100, in accordance with an exemplary embodiment of the present invention. Network 100 includes a plurality of base stations (BTS) 50, which transmit signals to mobile stations 20 in a cell in their vicinity. Generally, as is known in the art, each group of several base stations 50 are controlled by a base station controller (BSC) 22. As is known in the art, BSC 22 may be replaced by other units, such as by a radio network controller (RNC). Regular unicast data is transmitted to BSC 22 through a serving GPRS support node (SGSN) 24 and a gateway GPRS support node (GGSN) 26 from an IP core network 28, such as the Internet.

In some embodiments of the invention, in transmission of multicast data to mobile stations 20, a data source 30 generates files which are to be multicast to subscribing mobile stations 20. Optionally, the generated files are provided to a data server 42, which controls the provision of the file in a multicast transmission to mobile stations 20. In some embodiments of the invention, the generated files comprise multimedia files, optionally including sub-portions of different types (e.g., video, audio, rich text, images). Alternatively, the generated files may include any other data files, including, for example, text and/or executable files.

In some embodiments of the invention, data server 42 includes a forward error correction (FEC) unit 32, in which a plurality of FEC packets are prepared to represent blocks of the file. The FEC packets are generated using substantially any FEC method known in the art, including one-dimensional, two-dimensional, systematic and non-systematic methods. In an exemplary embodiment of the invention, a FEC method, such as described in Israel patent application 154,739, filed Mar. 4, 2003, in PCT application PCT/IL2004/000204 filed Mar. 3, 2004, in PCT application PCT/IL2004/000805, filed Sep. 7, 2004 and/or in Israel patent application 157,885, filed Sep. 11, 2003, titled "Iterative Forward Error Correction", the disclosures of which are incorporated herein by reference, is used.

The FEC packets are optionally transferred to an encryption unit 34, which encrypts the FEC packets, forming respective encrypted packets. The encryption of the data may be performed using any method known in the art, including symmetric and non-symmetric (i.e., public key and private key) methods. In an exemplary embodiment of the invention, the encryption is performed as described in Israel patent application 157,886, filed Sep. 11, 2003, titled "Secure Multicast Transmission" and/or in PCT application PCT/IL2004/000806, filed Sep. 7, 2004, the disclosures of which are incorporated herein by reference. Optionally, each packet or group of packets is marked with an identification of the key to be used in decoding the packet. Alternatively to performing encryption after producing the FEC packets, the file is first encrypted and then the FEC packets are generated from the encrypted file.

The encrypted packets of each base station 50 are transferred to the base station for transmission in a respective cell covered by the base station. In some embodiments of the invention, for example as shown in FIG. 1, the encrypted packets are provided through a respective point to multipoint unit (PTMU) 40 of the base station. Alternatively, the encrypted packets are provided to the base station along a data channel passing through GGSN 26, SGSN 24 and BSC 22. Optionally, in accordance with this alternative, data server 42 serves as a broadcast multicast service center (BMSC).

In some embodiments of the invention, the multicast data is transmitted by the base stations using the currently available bandwidth not used for other connections. Accordingly, different amounts of bandwidth for multicast may be allocated in different cells. Alternatively or additionally, some or all of the cells allocate a fixed bandwidth for multicast transmission. The fixed bandwidth is optionally determined according to the load in the cell, such that different cells allocate different bandwidth for multicast.

Optionally, the packets are provided to base stations 50 at a same rate in a synchronized manner, so that all the base stations receive the same data at the same time. In some embodiments of the invention, base stations 50 (or the BSCs 22 and/or PTMUs 40 servicing the base stations) whose multicast bandwidth allows a transmission rate lower than the rate at which the data packets are received from data server 42, are configured to drop some of the packets in a manner which keeps close synchronization of the transmitted data between different cells. Thus, a mobile station roaming between cells will not receive a large number of packets twice.

In some embodiments of the invention, the base stations 50 (or any other unit that performs the dropping for the cell) have small buffers (e.g., of the size of 2-5 packets) for the multicast data, so that the time difference between transmitting the same data between different base stations 50 is relatively small. Alternatively or additionally, the data packets are divided into blocks and base stations 50 are configured to drop packets of an old block when a first packet of a new block is received. Further alternatively or additionally, data server 42 transmits periodically an instruction to drop all old packets.

In some embodiments of the invention, identical packets are provided to all the base stations. Alternatively, different packets representing the same data, for example encoded using different keys and/or including different FEC protection segments, are provided to different base stations 50. The transmission of different FEC protection segments in different base stations 50 may be used, in addition to or instead of synchronous transmission, in avoiding reception of duplicate data by a moving mobile station.

Data server 42 optionally includes a key server 36, which provides decryption keys to mobile stations 20. In some embodiments of the invention, mobile stations 20 receiving the file, that are instructed to display the file (e.g., by the human owner of the receiver), contact key server 36 and request the keys they need for the decryption. In addition, mobile stations 20 that did not receive all the data during the multicast, optionally receive missing data portions from key server 36, acting additionally as a supplementary data server, as described below.

Although data source 30, FEC unit 32, encryption unit 34 and key server 36 are shown as separate units, in some embodiments of the invention, one or more of these units are implemented together. For example, encryption unit 34 and key server 36 may be implemented on a single processor and/or may use a common key database. Alternatively, FEC unit 32, encryption unit 34 and key server 36 may be implemented by a plurality of different units at different locations.

Optionally, key server 36 provides keys for decryption only to mobile stations 20 that have subscribed to the multicast data. Users optionally subscribe for receiving the multicast data with the data content provider. Alternatively or additionally, users register through the cellular service provider.

In some embodiments of the invention, data server 42 provides multicast data of a plurality of different categories, for example relating to different themes (e.g., sports, news, music, financial information). Categories may also be based on other attributes, such as profession of the user and/or predefined groups of users. Optionally, key server 36 provides keys for decryption only to mobile stations 20 subscribed to the category to which the transmitted file belongs. Alternatively, for some or all the categories, any user requesting decryption keys is provided with the keys and there is no need for prior subscription.

Optionally, some data files may relate to more than one category and are therefore provided to subscribers of all the categories to which they relate. In some embodiments of the invention, different notifications are transmitted for each category to which the data file relates. Alternatively, a single notification stating the categories to which the data file relates is transmitted. For example, each notification may include a list of the category numbers to which it relates. Alternatively, each notification has fields for all the possible categories and a bit is set for each category to which the data file of the notification relates. Each user registering to receive multicast data optionally states the categories the user is interested in.

In some embodiments of the invention, special data files (e.g., an extraordinary news broadcast, a promotion music or video clip) are provided to all subscribers or to all mobile stations, optionally even to those that did not subscribe to any category.

The user is optionally charged a flat price for the subscription to the multicast service and/or for each category the user is subscribed to. Alternatively or additionally, the user is charged for each data file for which decryption keys were requested. In providing the keys, key server 36 optionally marks the identity of the mobile stations 20 requesting keys, for billing purposes. Optionally, data files not delivered within a predetermined time are not billed for, or are provided for a reduced cost. For example, data files provided in a mailbox of the user due to unsuccessful transfer during the multicast, as described below, may be provided at a lower fee. Further alternatively or additionally, the transmission costs of some data files, such as promotion files, are charged to the data provider.

In some embodiments of the invention, data server 42 manages a subscriber list 44 which lists for each of the multicast categories, which mobile stations 20 are subscribed to the data of the group. The subscription information in subscriber list 44 is optionally used in determining whether to provide decryption keys as discussed above. Alternatively or additionally, the information in subscriber list 44 is used in determining that all the subscribed mobile stations 20 received the multicast file, as described hereinbelow. Further alternatively or additionally, the information in subscriber list 44 is used to update mobile stations 20 on the files they should receive, as described hereinbelow.

In some embodiments of the invention, a format handler 31 converts the multimedia content files into a format supported by a largest number of mobile stations 20. Alternatively, format handler 31 produces, for each generated multimedia content file, a plurality of different format files in accordance with different multimedia formats supported by different mobile stations 20. For example, some mobile stations 20 may only have software for displaying MPEG-4 video, while other mobile stations 20 only have software for displaying H.263 video. Format handler 31 produces a first format file with H.263 video and a second format file with MPEG-4 video. In another exemplary embodiment of the invention, mobile stations 20 differ in their screen sizes (e.g. CIF or QCIF), in the number of colors they support (e.g. 65,536 vs. 4,096) and/or in any other attribute that effects the amount of data used in representing still images and/or video.

In some embodiments of the invention, each format file from format handler 31 is handled separately by FEC unit 32, encryption unit 34 and base stations 50, as if the format files include different content. Optionally, each format file is transmitted on a different multicast session. In some embodiments of the invention, the format files are transmitted at different times, optionally on the same channel. For example, users supporting a first format are notified that the multicast transmission is at 15:15, while users supporting a second format are notified that the multicast transmission is at 15:25. In other embodiments of the invention, each format file is transmitted on a different multicast channel, e.g., identified by a separate destination IP multicast address, and each mobile station 20 is pre-programmed or otherwise instructed to tune onto the channel carrying the file including the video data in the format it supports.

Optionally, the different multimedia types are organized in the file or otherwise their transmission time is adjusted, such that portions that can be used before the entire file is received are transmitted earlier. For example, if mobile stations 20 can display images of the multimedia file before other portions of the file are received, the images are preferably transmitted at the beginning of the transmission. Thus, the user can view the images before the entire file is transmitted.

Some multimedia files may include a plurality of different types (e.g., video, images, rich text, executable, audio) of data. In some embodiments of the invention, portions of the data in a format supported by all mobile stations 20, are included in identical copies in each of the format files generated by format handler 31 for the multimedia content file. Alternatively, in order to conserve bandwidth, the data content of the generated file is divided by format handler 31 into a plurality of portions of different data types. For each portion, format handler 31 generates one or more sub-files, each sub-file corresponding to a different format of the portion. Optionally, for portions that do not vary with format, only a single sub-file is generated. Each sub-file is handled separately by the network elements after format handler 31 (e.g., FEC unit 32, encryption unit 34, base stations 50), as if it is a separate file. In some embodiments of the invention all sub-files originating from the same file are encrypted with the same keys or set of keys, in order to reduce the number of keys used. Alternatively, in order to reduce the possibility of unwarranted disseminating of keys, sub-files of different formats are encoded with different keys.

In some embodiments of the invention, each sub-file is transmitted on a separate multicast session, e.g., a separate multicast channel. Each mobile station 20 receives sub-files on a group of multicast channels carrying a set of sub-files that reconstruct the file, i.e., mobile station 20 receives a single sub-file for each portion of the file. The mobile station optionally receives sub-files of the formats that it supports. The mobile station 20 optionally combines all the sub-files it receives into a single file, which is transferred to the application destined to receive the file. The combining of the file may be, for example, according to the multipart MIME format known in the art and described, for example, in RFC (request for comments) 2387, available at http://www.ietf.org/rfc/rfc2387.txt, the disclosure of which is incorporated herein by reference.

In some embodiments of the invention, a separate channel is allocated for the transmission of control information related to the structure of the multimedia file. This control channel is optionally received by all mobile stations 20 intended to receive the file or parts of the file. The control channel optionally carries information on how the different sub-files are to be put together into a single multimedia file. In some embodiments of the invention, the control channel indicates the order of the portions and/or their positions in a hierarchy and/or sequence of the portions in the file. Alternatively or additionally, the control channel includes indications of the portions that are mandatory and those that are optional.

In some embodiments of the invention, a mobile station is adapted to decode a plurality of different formats of one or more types of multimedia. Optionally, the mobile station is configured to receive a single format for each sub-portion. The received format (e.g., the session to tune onto) is optionally selected from the supported formats, as that format which provides best quality and/or lowest battery usage. Alternatively or additionally, other considerations may be used in determining which format to receive, such as transmission time.

Alternatively, base stations 50 periodically collect information from the mobile stations 20 on the formats they support in the various multimedia types (e.g., video, audio) and accordingly instruct the mobile stations, to which channels they are to tune. In accordance with this alternative, a base station may determine that a specific format is not required by any of the mobile stations 20 in its cell, and not transmit that format.

Alternatively, a mobile station 20 may receive a plurality of sub-files of different formats for a single portion. The mobile station 20 determines which of the sub-files to display, after the reception, for example based on the reception quality and/or the data sizes of the files. Further alternatively or additionally, a mobile station 20 may receive fewer than all the sub-portions of the multimedia file. For example, a mobile station 20 that does not support any of the formats of a specific type (e.g., audio) may receive the file without the portions that it does not support. Alternatively or additionally, a mobile station 20 set to have minimal battery utilization does not receive one or more portions of the file.

In a simple exemplary embodiment of the invention, a multimedia file is divided by format handler 31 into a video portion and a non-video (e.g., text) portion. Two sub-files are generated for different formats of the video portion and a single sub-file is generated for the non-video portion. Each of the three sub-files is transmitted on a respective multicast channel and each mobile station 20 tunes onto a channel carrying a video sub-file and onto the channel carrying the non-video sub-file. In more complex exemplary embodiments, the multimedia file may be broken into at least three, five or even six or more sub-portions, for example including video, images, audio, rich text and executable portions. For each of the sub-portions, format handler 31 generates a separate sub-file for each format expected by mobile stations 20 supported by network 100. It is noted that different mobile stations may support different permutations of formats. In an exemplary embodiment of the invention, a first mobile station requires audio of a format A1, video of a format V1 and images of a format I1, a second mobile station requires audio of format A1, video of a format V2 and images of a format I2 and a third mobile station requires audio of a format A2, video of a format V3 and images of format I1.

In some embodiments of the invention, each sub-file is transmitted on a separate multicast channel. Alternatively, sub-files that are always required together are transmitted together on a single multicast channel. For example, if specific video and audio formats are always supported together, a single sub-file may include both the video and audio data of that format. Other video and audio formats that are not always supported together are optionally transmitted separately.

Figure 2:
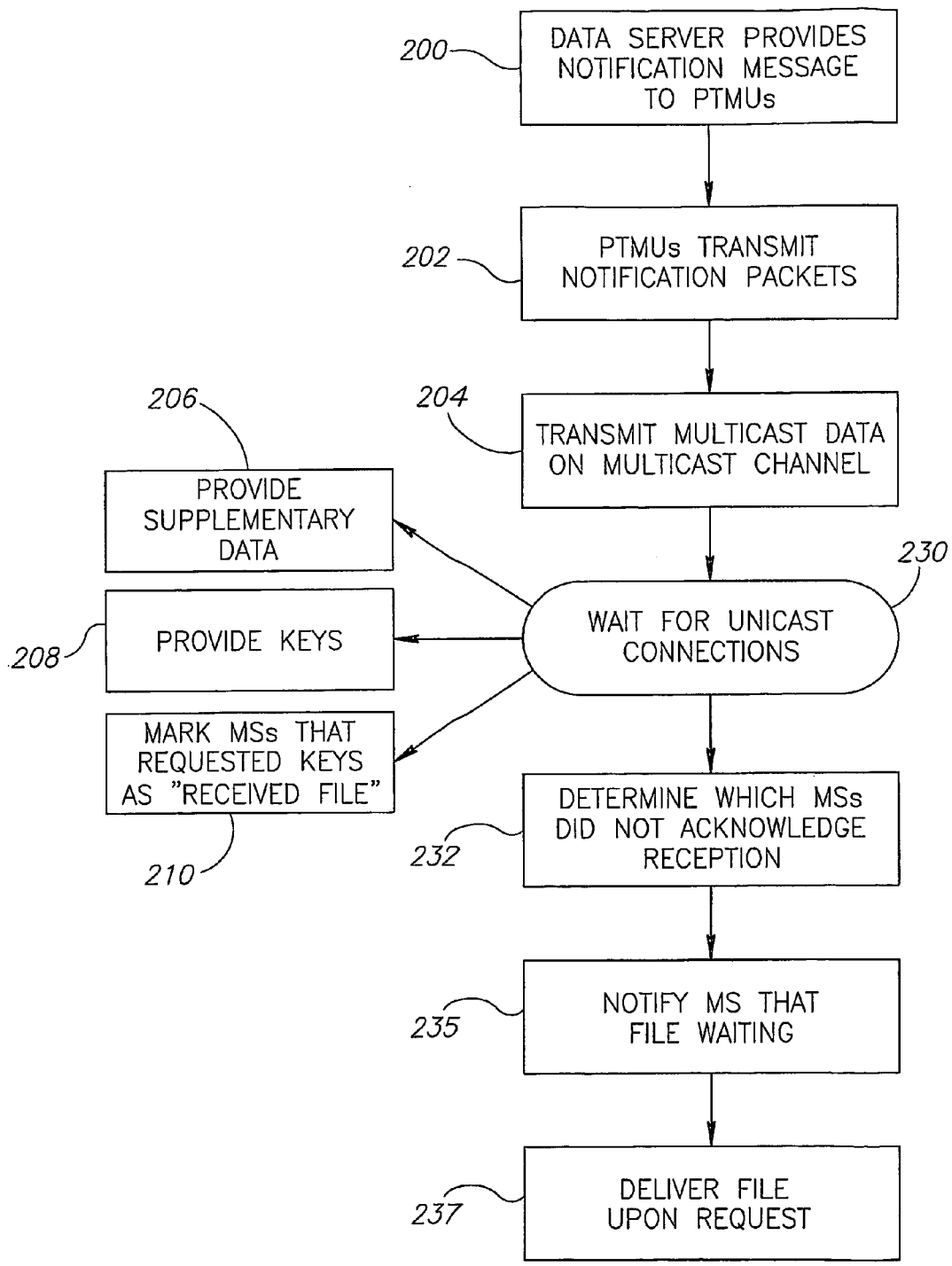
FIG. 2 is a flowchart of acts performed by network elements in multicasting a file to mobile stations, in accordance with an exemplary embodiment of the invention.

FIG. 2 is a flowchart of acts performed by network elements in multicasting a file to mobile stations 20, in accordance with an exemplary embodiment of the invention. Data server 42 optionally provides (200) each PTMU 40 with a notification message on an upcoming multicast transmission. Responsive to the notification message, PTMUs 40 generate notification packets which they transmit (202) in their cell. The notification packets optionally include a timing of the transmission and a channel on which the transmission is provided. Alternatively or additionally, the notifications are generated and/or transmitted using any other method known in the art. In an exemplary embodiment of the invention, the notifications are generated automatically responsive to opening a multicast data channel.

At the designated transmission time, optionally without waiting for application layer acknowledgements of the notification messages, the file is transmitted (204) on the multicast channel. After the transmission is completed, and optionally during the transmission, data server 42 waits (230) for unicast connections from MSs 20 receiving the multicast transmission. On the unicast connections, data server 42, for example key server 36 thereof, provides (206) supplementary data and provides (208) decryption keys, as discussed below with reference to FIG. 3. Data server 42 marks (210) mobile stations 20 that requested keys as receiving the data file, for example for billing purposes, as the requesting of the keys serves as an indication that the data file was properly received. That is, mobile stations 20 optionally do not request keys unless they have received sufficient data to reconstruct the file.

After the waiting period, data server 42 optionally determines (232) which mobile stations, subscribed to a multicast group to which the file belongs, did not acknowledge receipt of the data file. These mobile stations 20 may, for example, have been turned off, located in cells not supporting multicast, did not receive the notification message due to data loss and/or did not succeed to establish a unicast connection with key server 36. Optionally, these mobile stations are notified (235) that the data file is waiting for them. The notified mobile stations then optionally establish a unicast connection with key server 36 on which the data file is delivered (237) to the mobile station.

Referring in more detail to transmitting (202) the notification on the upcoming multicast, in some embodiments of the invention the same notification message is provided to each of PTMUs 40 and each PTMU generates a separate notification packet for transmission in its cell. Optionally, the notification message includes a time of beginning of the multicast transmission and/or a duration of the transmission. In an exemplary embodiment of the invention, rather than stating a time for the beginning of the multicast transmission, the multicast transmission is carried out a predetermined time after the notification packet is transmitted. The notification message optionally further includes a file size, information on the type of FEC used and/or the type of encryption used. For each file transmitted, the notification message optionally identifies the multicast category (or categories) to which the file belongs.

The notification packet transmitted by base station 50 is optionally transmitted on a cell broadcast channel. Alternatively or additionally, the notification packet is transmitted as an SMS message to the mobile stations. Further alternatively or additionally, the notification packet is transmitted to the mobile stations using their IP address, for mobile stations having an IP address. In an exemplary embodiment of the invention, in base stations 50 associated with a PTMU 40, the notification packet is generated by the PTMU, while in other base stations the notification packet is provided through a regular cell broadcast service.

In some embodiments of the invention, the notification packet is transmitted to all mobile stations 20 in the network, regardless of whether they are registered to receive the multicast transmission. Optionally, mobile stations 20 not registered to receive the multicast transmission discard the notification in the application layer. Alternatively, the notification is transmitted with a sub-channel identity of the mobile stations registered to the list, such that the mobile stations 20 not on the list discard the notifications in a low communication layer.

Although in the above description each file that is multicast has a separate notification message, in some embodiments of the invention, a single notification message is used for a plurality of files that are multicast. Alternatively or additionally, a plurality of notification messages are generated for a single file, in order to increase the chances that at least one of the notifications will be received. The notification packets optionally have a high FEC protection level, so as to minimize the loss of the notification packet due to an interfering noise.

In some embodiments of the invention, the multicast file is transmitted on a single channel and the notification identifies this channel. In other embodiments of the invention, the multicast file is transmitted on a plurality of channels and the notification identifies a group of channels on which the multicast file is transmitted. Optionally, each mobile station is configured with a table that correlates between a group ID and the multicast channels of the group. The notification includes the group ID, which is interpreted by mobile stations 20 into the multicast channels. Alternatively or additionally, each mobile station 20 is configured for each group with an identification of the members of the group to which the specific mobile station is to tune. Further alternatively, the notification lists the multicast channels belonging to the group and/or an identification of the sub-files carried by each of the channels.

As described above, different types of sub-files of a multicast file may be transmitted on different multicast channels, such that portions of a single multicast file are transmitted on a plurality of multicast channels. It is noted that transmission of a multicast file in portions on a plurality of multicast channels may be performed for other reasons. For example, a plurality of multicast channels may be used in order to lower the transmission duration and/or to enhance the transmission efficiency, as described for example in the above mentioned PCT application PCT/IL2004/000805.

Referring in more detail to waiting (230) for unicast connections, in some embodiments of the invention, data server 42 optionally waits a predetermined time for acknowledgements after the multicast session is completed. The amount of wait time is optionally selected according to the number of receivers on the list of mobile stations 20 to receive the transmission and/or the transmission rates in the network.

Referring in more detail to notifying (235) the non-acknowledging mobile stations 20 that the file is waiting for them, in some embodiments of the invention, the notification is transmitted on a short message (e.g., SMS). Optionally, the notification is transmitted a plurality of times consecutively in order to reduce the chances that the notification is not received. Alternatively or additionally, the notification is transmitted on a low loss channel and/or with a high forward error protection.

Optionally, before downloading the file, the mobile station verifies that it did not yet receive the file. In some embodiments of the invention, when a relatively large number of mobile stations 20 did not receive the file, the short message indicates an interval in which it is best to download the file (different intervals being indicated to different mobile stations), so as to reduce the load on data server 42.

In some embodiments of the invention, data files delivered (237) on a unicast connection are provided in a different, more efficient, format than provided on the multicast connection (e.g., using less or no FEC protection). Alternatively, for simplicity, the same packets are provided on the unicast connection as on the multicast connection.

In some embodiments of the invention, mobile stations 20 are required to acknowledge receipt of the notification, for example by transmitting a return SMS message. Alternatively, mobile stations 20 do not acknowledge receipt of the notifications and notifications are retransmitted to mobile stations that do not collect the file within a predetermined time.

For mobile stations from which an acknowledgement was not received, repeated attempts are optionally made to provide the notification, until the data is properly delivered. Alternatively, or after a predetermined time (e.g., several hours) and/or a predetermined number of attempts, the data file is considered old and no more attempts to deliver the file are made. Optionally, a message is sent to a mailbox of the mobile station notifying that the old file was not delivered. Optionally, the mobile station 20 can then establish a unicast connection with the data server at any time to collect the old file, if desired. Alternatively or additionally, the old file is placed in a mailbox of the mobile station 20 such that it can be collected therefrom by the user. Optionally, a message reporting the placement of the file in the mailbox is transmitted to the mobile station. In some embodiments of the invention, the reporting message is transmitted only a period of time after the placement in the mailbox, only if the receiver did not pick up the file. Thus, the number of messages required is decreased.

Alternatively to transmitting (235) a notification to the non-acknowledging mobile stations 20, the data file is provided to non-acknowledging mobile stations on a unicast data connection established by key server 36 or on an MMS transmission, with each of the mobile stations. Optionally, in accordance with this alternative, before providing the file on the connection, the mobile station is queried as to whether it has already received the file.

Further alternatively or additionally, data server 42 does not manage a subscription list at all or does not provide the file to mobile stations 20 that do not request the file.

Figure 3:
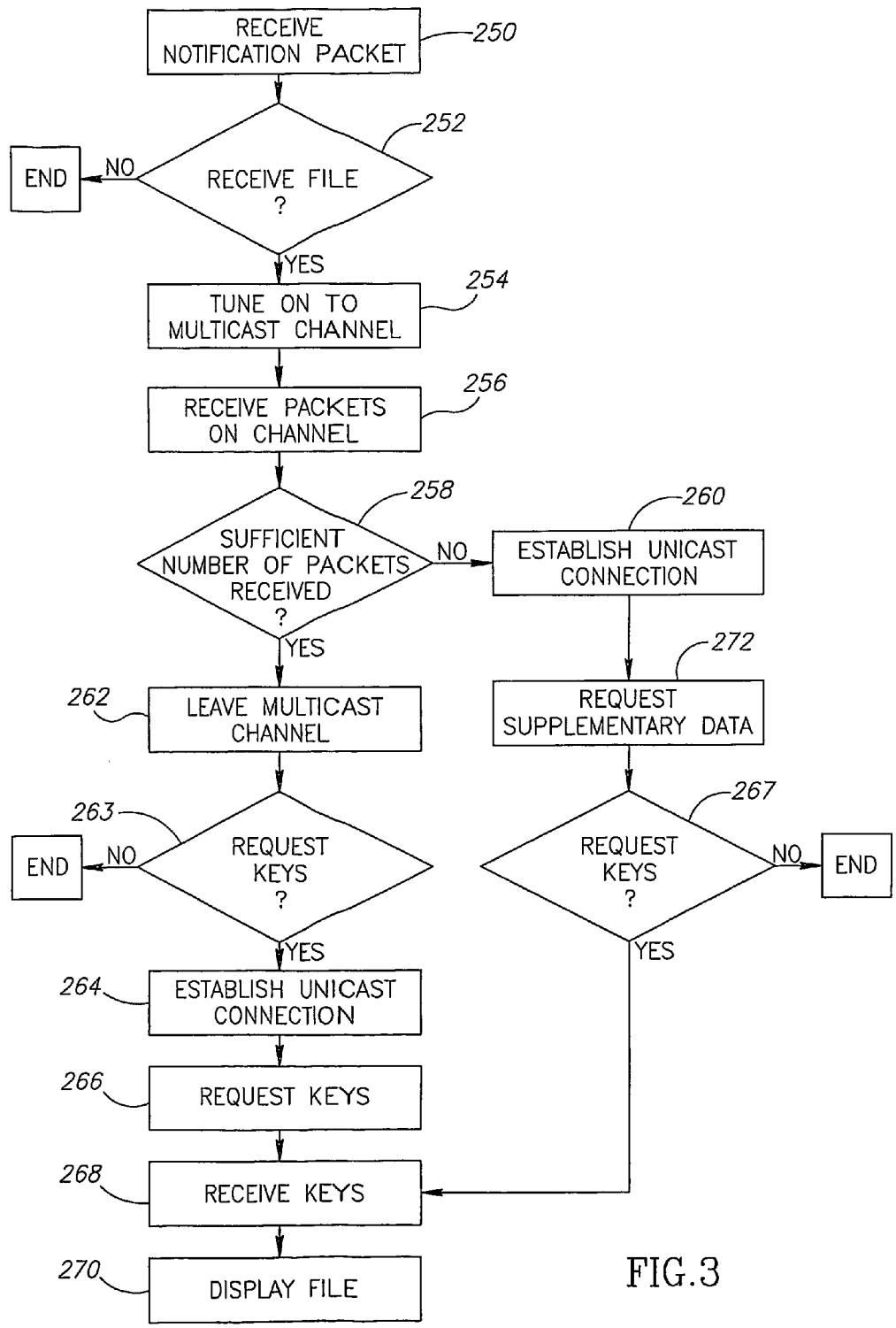
FIG. 3 is a flowchart of acts performed by a mobile station in receiving a multicast data file, in accordance with an exemplary embodiment of the invention.

FIG. 3 is a flowchart of acts performed by a mobile station in receiving a file in a multicast transmission, in accordance with an exemplary embodiment of the invention. Upon receiving (250) the notification packet, the mobile station determines (252) whether to receive the file, for example, by consulting a subscription profile record on the mobile station, by determining whether the file was received already and/or by querying the user. If the file is to be received, the mobile station tunes (254) onto the multicast channel (or channels) on which the file is provided, optionally as identified in the notification packet. The mobile station then receives (256) packets of the file on the multicast channel. During the packet reception, the receiver repeatedly checks (258) if a sufficient group of packets for reconstruction, were received. If (258) a sufficient group of packets for reconstructing the file are received during the multicast session, the mobile station stops receiving (262) the multicast channel, possibly during the multicast session.

In some embodiments of the invention, the mobile station determines (263) whether to request the keys required for decoding the file. If it is determined to request the keys, the mobile station establishes (264) a unicast connection with key server 36. On the unicast connection, the mobile station 20 requests (266) the keys it requires in order to decode the packets it received, and receives (268) the requested keys on the established unicast connection. The file is then displayed (270) to the user.

If (258) a sufficient number of packets were not received during the multicast session, the mobile station establishes (260) a unicast connection with key server 36 and requests (272) supplementary packets. In some embodiments of the invention, if additional multicast sessions for the same data file are scheduled, the mobile station waits for the additional session and does not request supplementary data yet. Key server 36 provides the supplementary packets on the unicast connection. Thereafter, the mobile station optionally determines (267) whether to request the keys required for decoding the file. If it is determined to request the keys, on the same connection, key server 36 optionally provides (268) the keys required for decrypting the packets. In some embodiments of the invention, mobile station 20 requests the keys after receiving the supplementary packets. Alternatively, mobile station 20 requests the keys along with the request for supplementary packets.

Alternatively, the keys and supplementary data are provided on separate unicast connections. For example, the connections may be established with two separate units, one of which provides the keys and the other provides supplementary data. Alternatively or additionally, the receiver may first receive the entire data file and then ask the user whether to request the keys. For example, as described below, the user may first view a preview of the data before requesting the keys. In some embodiments of the invention, between the two unicast connections, the receiver mobile station 20 does not tune onto the multicast channel for additional data, as the required data is supplemented on the first unicast connection.

In some embodiments of the invention, the received data file includes a non-encoded portion which is previewed by the user in order to determine whether to request the keys of the encoded portion. A data supplementing connection is optionally established, if necessary, before the preview is displayed in order to fill in data required for the preview and a key requesting connection is optionally established after the preview, if desired. Acknowledgement of data receipt may be supplied on either connection. Charging, however, is performed only if keys are requested on the second connection.

In some embodiments of the invention, the data file includes a plurality of portions encoded with different keys. Upon receiving the file, the mobile station requests a first set of keys for decrypting a first portion of the file. Thereafter, based on viewing the first portion of the file, the user instructs mobile station 20 whether to request keys for one or more additional portions of the file. Based on viewing the additional portions, the user may determine whether to request keys for further portions of the file. Optionally, the order of requesting keys is predetermined, such that key server 36 will not provide keys for a second portion if keys for the first portion were not requested. Alternatively, the encrypting is performed in a manner which allows decryption only according to the allowed order. In some embodiments of the invention, according to the allowed decryption order of the portions, each portion is encrypted with a function of all the keys of the previous portions in addition to its key. Thus, each portion can only be decrypted after receiving all the keys of the previous portions. Alternatively, the last portion is encrypted first with its key. Thereafter, the last portion and the previous portion is encrypted with the key of the previous portion. This process is optionally continued for all the portions, so that to decrypt a portion its keys and the keys of all the portions before it are required.

In some embodiments of the invention, the user is notified when receiving the first portion, on the structure of the file and the number of portions it has. The user can then request the keys for all the portions at once or request one or more keys in a plurality of separate requests. Alternatively, the user is not notified as to the structure of the file in advance, and each time the user requests keys, the user is provided with a set of keys of the next portion. Further alternatively, the user may determine which of the portions to decode, in substantially any order.

Alternatively to mobile station 20 automatically requesting the keys for the first portion, the keys are requested only after receiving an instruction from the user, for example after viewing a free preview. In some embodiments of the invention, the file includes a plurality of free previews for different encoded portions.

Alternatively to the preview portions being non-encoded, the preview portions are encoded with a special key for previews. The preview key is optionally provided to subscribing mobile stations upon subscription, before the file is transmitted on the mobile channel. Alternatively, the key is requested by the mobile station after the receiving of the data and serves as a first indication of the reception of the data.

Alternatively to providing the decryption keys to all of mobile stations 20 after the multicast transmission, some of mobile stations 20 are provided the decryption keys before the transmission. Optionally, the decryption keys are provided to some of mobile stations 20 before the multicast transmission, in order to reduce the load on key server 36 after the multicast transmission.

Optionally, key server 36 determines a number of mobile stations 20 to receive the keys before each multicast transmission, sequence of multicast transmissions and/or time period using same keys. In some embodiments of the invention, key server 36 estimates the total number of mobile stations 20 that will require the keys. Accordingly, key server 36 selects a number of mobile stations 20 to receive the keys in advance, such that the network is not overloaded in supplying keys immediately after the multicast transmission. In an exemplary embodiment of the invention, at least 80%, 90% or even 95% of the mobile stations 20 receive the keys in advance, generally isolating those receivers that behave suspiciously.

The total number of mobile stations to request keys is optionally estimated according to the number of subscribers to the multicast group (or groups) to which the file belongs. Alternatively or additionally, information on the percentage of subscribers that requested keys after previous transmissions of similar multicast files is used in the estimation. Further alternatively or additionally, the number of mobile stations 20 currently shut off is used in the estimation.

After determining the number of subscribers to receive the keys in advance, key server 36 optionally determines which mobile stations 20 receive the keys in advance. Optionally, key server 36 manages a reliability score or record, for each mobile station 20. In some embodiments of the invention, the keys are provided in advance to the mobile stations 20 having highest reliability scores. Alternatively, the keys are provided in advance to mobile stations 20 having scores above a predetermined threshold. In accordance with this alternative, the keys may be provided to fewer or more mobile stations 20 than the determined number of mobile stations. In some embodiments of the invention in accordance with this alternative, key server 36 does not determine a number of mobile stations 20 to receive the keys.

For simplicity, the predetermined threshold is optionally the same for all multicast transmissions. Alternatively, the threshold is set dynamically according to the estimated total number of subscribers to request the keys and/or according to the importance of the data in the multicast file (or files) transmitted. For example, a higher reliability rating may be required in order to receive in advance keys for highly desired files, while receiving in advance keys to less desired files requires a lower reliability score.

In some embodiments of the invention, the determination of mobile stations 20 to receive the keys in advance depends at least partially on the locations of the mobile stations. Optionally, the keys provided in advance are multicast in cells of mobile stations 50 in which all the mobile stations 20 have a sufficiently high reliability score. Alternatively or additionally, keys are provided in advance in cells in which the mobile stations have a relatively high average reliability score. Optionally, the keys of the cells in which mobile stations 20 do not receive the keys in advance are different than the keys provided in advance, such that collaboration between mobile stations 20 in different cells does not necessarily allow access to the file.

In some embodiments of the invention, at least some base stations 50 continuously or periodically transmit their keys, encrypted with the keys of neighboring cells, on a control channel. Mobile stations 20 moving between cells can use the keys they received in advanced in their old cell to decrypt the keys of the current cell. Alternatively or additionally, one or more base stations broadcast on a control channel the keys of neighboring cells encrypted with their keys. Thus, before moving between cells, a mobile station 20 can determine the keys of the cell to which it is moving.

The reliability score is optionally assigned according to the history of the mobile station 20 in acknowledging receipt of multicast files in previous cases in which keys were provided to the mobile station in advance. It is noted that a mobile station 20 may not acknowledge receipt of a file due to the fact that the file was not received (e.g., because of high noise levels). Therefore, in some embodiments of the invention, the reliability score is a statistical measure and does not necessarily indicate the actual reliability of the mobile station 20. Alternatively or additionally, the reliability score depends on the payment record of the bills of mobile station 20 and/or a special rating provided based on knowledge on the reliability of the owner of the mobile station.

Those mobile stations 20 determined to receive the keys in advance, are optionally provided the keys in the time between the transmission of the notification and the multicast transmission of the file. Alternatively, the keys are provided together with the notification on the upcoming transmission. Further alternatively or additionally, the keys may be provided in advance for all the transmissions of one or more days or even weeks. Optionally, the keys are changed when the percentage of acknowledging mobile stations 20 reduces. Further alternatively or additionally, the keys are provided during the multicast transmission. In some embodiments of the invention, the keys are provided even after the multicast transmission, when key server 36 is not too busy responding to requests for keys. Further alternatively or additionally, when mobile stations 20 acknowledge receipt of a multicast transmission, they receive the key for one or more next multicast transmissions.

Optionally, the keys are provided on unicast connections, which include acknowledgement of reception of the keys by mobile stations 20. Alternatively, in order to shorten the durations of the transmissions, the keys are provided without acknowledgement. In accordance with this alternative, some of the mobile stations supposed to receive the keys may not actually receive the keys. In some embodiments of the invention, the keys are provided in advance in multicast transmissions.

It is noted that in some embodiments of the invention, a mobile station 20 may not be able to decrypt the received file, even though it received the keys in advance. For example, some of the keys may have been lost during transmission. Alternatively or additionally, a mobile station 20 may be provided with keys that cannot decrypt the packets actually received by the mobile station 20, for example because the mobile station moved between cells between receiving the keys and receiving the multicast transmission. Such mobile station 20 not being able to decrypt the file optionally requests the keys it requires after the mobile transmission, as other mobile stations 20 that did not receive the keys in advance.

The mobile stations 20 are optionally configured to transmit an acknowledgement message to key server 36, at least a predetermined time after the multicast transmission. In an exemplary embodiment of the invention, mobile stations 20 receiving the keys in advance are instructed to acknowledge receipt of the multicast transmission at a randomly selected time between 20-40 minutes after the multicast transmission.

Referring in more detail to receiving (250) the notification packet, in some embodiments of the invention, the notification packet includes a low level indication (e.g., a multicast group address) of the mobile stations to which it is directed, and the mobile station provides the notification to the application layer only if the notification packet is directed to the mobile station (e.g., the low level indication matches the mobile station).

Referring in more detail to determining (252) whether to receive the file, in some embodiments of the invention, each mobile station 20 manages a subscription profile which lists the categories to which it is subscribed. Upon receiving the notification packet, the mobile station 20 optionally consults its subscription profile to determine whether to receive the file referred to in the notification packet. Alternatively or additionally, mobile station 20 displays or sounds a message to the user, asking whether to receive the file. Optionally, in accordance with this alternative, mobile station 20 is configured with default decisions on the acts to be performed when a response is not received from the user. For example, a mobile station 20 may be configured to receive all files of a first multicast category, to ask the user about files of a second multicast category but to receive the file if no answer is received, and to ask the user about files of a third multicast category but not to receive the file unless specific instructions were received from the user. It is noted that the decision on whether to receive the data of the file is separate from the decision on whether to decode the file and pay for it. A user may decide, for example, to receive any file that has a fair chance to be decoded, in order not to lose time until the file is received, although such reception utilizes the battery power of the mobile station.

In some embodiments of the invention, the rules on whether to receive a file, query the user and/or not receive a file may depend on one or more external parameters not related to the transmission (e.g., the time, date, location of the mobile) and/or one or more internal parameters related to the transmission (e.g., file size, planned transmission rate, expected error rate).

In some embodiments of the invention, the subscription profile in mobile station 20 is configured by the user of mobile station 20, through a user interface of the mobile station, according to user preferences. Alternatively, the subscription profile is configured by a control message transmitted from data server 42 (or from any other remote network unit), according to subscription information in subscription list 44. The control messages are optionally transmitted to mobile station 20 periodically and/or whenever there is a change in the subscription information.

Alternatively to mobile station 20 keeping track of the categories of files it is to receive, the notification packets are transmitted only to mobile stations 20 that are to receive the message, for example using directed unicast SMS messages. Alternatively or additionally, upon receiving the notification packet, mobile stations 20 that do not know if they are to receive the file, query data server 42.

In some embodiments of the invention, a mobile station 20 that received the notification but will not be receiving the file, although being subscribed to receive the file according to subscription list 44, notifies data server 42, so that attempts will not be made to deliver the packet to the mobile station on a unicast connection. Alternatively, the mobile station does not notify data server 42. Optionally, in this alternative, the mobile station ignores the message notifying that the file can be retrieved in unicast or notifies the data server that it is not receiving the file upon receiving the message.

In some embodiments of the invention, the same file is transmitted on the multicast channel a plurality of times in order to make sure that as many receivers as possible receive the file in a multicast transmission. For example, if after a first multicast session of transmitting the file, less than a predetermined number (70-80%) of subscribers acknowledge receipt, instead of providing the file in unicast to all the other subscribers, the file is retransmitted in another unicast session. Alternatively or additionally, a second multicast session is used without relation to the number of acknowledgments received, to make sure that as many as possible receivers use the multicast session to receive the file. The number of multicast sessions is optionally adjusted according to the number of subscribed mobile stations that did not acknowledge reception yet. Optionally, repeated multicast sessions are conducted until the number of non-acknowledging subscribers is below a predetermined percentage.

The multicast sessions may be conducted substantially immediately one after the other, or may be conducted, at different times of the day, e.g., separated by an hour or two. In some embodiments of the invention, each multicast session is preceded by a notification to all the subscribers or to all subscribers that did not acknowledge receipt of the file. Delivery of the file to non-acknowledging mobile stations is optionally performed after all the multicast sessions were completed. Optionally, in these embodiments, in determining (252) whether to receive the file, mobile station 20 verifies that the file was not yet received.

Referring in more detail to tuning (254) to the multicast channel, in some embodiments of the invention, the tuning (254) to the multicast channel is performed passively by mobile station 20, without exchanging link layer packets with the network. Alternatively, before tuning onto the channel, mobile station 20 transmits a link layer message to PTMU 40, notifying that the mobile station is interested in receiving the multicast file. A PTMU 40 that did not receive responses from any mobile stations 20, optionally does not transmit the multicast data. Alternatively or additionally, the link layer responses are used by PTMU 40 to determine the layout of the mobile stations 20 interested in the multicast file in its cell. In some embodiments of the invention, PTMU 40 determines according to the received link layer responses, whether to transmit the data in multicast or in unicast or in a combination thereof. Optionally, a cost function is calculated for multicast transmission and for unicast transmission and the cheaper alternative is used. In some embodiments of the invention, the multicast transmission is given an extra preference score for the possibility that mobile stations currently in other cells will enter the cell of the PTMU 40 during the multicast transmission.

In some embodiments of the invention, the link layer responses and/or the determined mobile station layout of the cell are used in selecting parameters of the transmission, such as the power level of the transmission, the frame error protection and/or any other parameter affecting the average energy per bit of the transmission.

The parameters are optionally selected so as to ensure proper reception of the file by a percentage of the mobile stations lower than 100%, for example between 90-95%. Generally, ensuring proper reception of the file by 100% of mobile stations 20 in the cell requires a relatively large amount of resources, higher than required for achieving reception by 90-95% of the mobile stations and supplementing the rest in unicast.

Alternatively or additionally, one or more transmission parameters are selected by data server 42, so as to achieve a desired percentage of successfully receiving mobile stations 20. Optionally, the transmission parameters are automatically selected according to periodic updates on the state of the network, not received responsive to the current transmission. Alternatively or additionally, the transmission parameters are configured by a network operator according to the general structure of the network and/or the desired service characteristics. The transmission parameters controlled by data server 42 optionally include the level of redundancy of the FEC, the transmission rate and/or the number of retransmissions of the data. The selection of transmission parameters is optionally performed responsive to the average number of receivers, the size of the transmitted file and the network loss rate.

Optionally, before tuning onto the multicast channel, mobile station 20 requests an IP address to be used in receiving the data. The same IP address is optionally used for the unicast connection.

Alternatively or additionally to determining (267) whether to request the keys required for decoding the file after the supplementary data is received, in some embodiments of the invention, the determination is performed before requesting (272) the supplementary data or before establishing (260) the unicast connection, such that the supplementary data is not requested unless the keys will be requested.

Referring in more detail to establishing (260 or 264) the unicast connection, in some embodiments of the invention, mobile stations 20 determine when to request the keys at least partially randomly, so that the load on key server 36 is distributed over the waiting period. Alternatively or additionally, mobile stations 20 receiving all the data during the multicast session may contact key server 36 immediately, while mobile stations 20 requiring supplementary data contact key server 36 at a random interval after the multicast session.

Alternatively or additionally, different base stations 50 instruct the mobile stations they service, for example in the notification packets, on different times at which they are to contact key server 36. Alternatively or additionally, a plurality of key servers are provided and the notification packets instruct the mobile stations 20 as to which key server they are to contact.

In some embodiments of the invention, the multicast data may be received even by mobile stations 20 that do not have an IP address. Optionally, if the mobile station does not already have an IP address, establishing the unicast connection includes requesting an IP address from GGSN 26. In some embodiments of the invention, the unicast connection is established through a wireless application protocol (WAP) gateway. Optionally, in some of these embodiments, the entire provision of the data file, including the requesting of supplementary data and decryption keys is performed without the mobile station having an IP address.

Referring in more detail to determining (263 or 267) whether to request the keys, in some embodiments of the invention, the user decides whether to request the keys. Optionally, the decision is made based on viewing the preview. Alternatively or additionally to the user deciding whether to request the keys, the user and/or a system operator may configure the mobile station with rules on when to request the keys automatically. The rules on when to request the keys automatically may optionally be the same as the rules for receiving the file and/or may be different from the rules for receiving the data. Optionally, the preview portion of the file includes information which can be used in automatically determining whether to request the keys. For example, in providing sport clips, the data may include the teams involved or the time during the game. A user may configure his/her mobile to automatically request keys for games of a certain team and/or occurring at a specific time during the game.

Referring in more detail to providing supplementary packets in response to requesting (272) supplementary data, optionally, the mobile station determines a minimal set of packets required in order to allow reconstruction of the data file and requests these specific packets. Alternatively, the mobile station notifies server 38 which packets it received and the data server determines a minimal set of packets to be provided to the mobile station. Further alternatively, the supplementary packets include original packets, even if requiring transmission of a larger number of packets than optimal. Further alternatively or additionally, during the unicast connection mobile station 20 periodically determines whether it has sufficient packets for reconstruction and accordingly requests more packets.

The supplementary packets and/or data files provided on unicast connections are optionally provided along with the keys required for decoding the data. Alternatively, the supplementary packets and/or the data files provided on unicast connections are provided non-encoded. Further alternatively, as with multicast data, the mobile station must request the keys separately, even if on the same connection, as a verification that the data was properly received.

In some embodiments of the invention, users receiving some of the multicast files are encouraged to transfer the files to their friends using a unicast transmission service, such as MMS. The cellular service provider receives revenues from such transmission. In addition, such transfer could induce users to subscribe. Alternatively or additionally, some multicast files are prevented from being distributed to non-subscribers, for example using digital right management (DRM) methods to limit distribution.

In some networks, in order for a mobile station 20 to transmit data on an application layer uplink, or even a network or transport layer link, the mobile station needs to leave the multicast connection and establish a unicast connection.

In order to continue receiving the multicast data, the mobile station would need to retune onto the multicast channel. The changing of channels is generally time consuming and therefore reduces the transmission quality. In the above described embodiments, each mobile station 20 is required to transmit messages to contact data server 42 only a limited number of times, for receiving the multicast file, thus simplifying the network operation in providing multicast data.

In some embodiments of the invention, each mobile station establishes only a single application layer unicast connection in order to receive the multicast data, from the receiving of the notification to the reconstructing of the file. Optionally, beyond the single application layer connection, the mobile stations do not establish any transport or network layer connections in connection with receiving the data file. Alternatively to receiving the data on an application layer connection, the data may be received using a transport layer connection or even a network layer connection.

The uplink transmissions are optionally carried out after the multicast transmission, such that there is no need to retune onto the multicast channel.

Uplink application layer transmissions, as well as transport and network layer transmissions, generally differ from link layer transmissions in that link layer transmissions do not require establishing a connection. In addition, the application layer transmissions are generally directed to units out of the public land mobile network (PLMN) servicing the mobile station, while link layer transmissions are directed to elements of the PLMN. The application layer transmissions of substantially all the mobile stations are generally handled by a single server or by a plurality of synchronized servers. Link layer transmissions, on the other hand, are generally handled by respective local network units which are not synchronized regarding the data exchanged with the mobile stations.

In the above exemplary embodiment, the application layer uplink transmissions are for requesting supplementary data, requesting decoding keys and/or reception acknowledgement.

Alternatively to receiving the entire file before previewing and deciding whether to receive the file and/or request the decoding keys, in some embodiments of the invention, the preview may be viewed before receiving all the data. Optionally, during the multicast transmission, the preview can be reconstructed separately from the encoded data, e.g., there are separate FEC blocks for the preview. When a receiver determines that it has a sufficient number of packets for preview, the receiver optionally reconstructs and displays the preview immediately. Thus, the user can decide that the file is not desired even before receiving the entire file, so that battery power can be conserved.

Further alternatively or additionally, the notification packet indicates a series of transmission sessions. In an exemplary embodiment of the invention, the series of transmission sessions includes a preview transmission session and a data file transmission session. Optionally, the preview session is carried out a few minutes before the data transmission, so that the user has sufficient time to decide whether to receive the file before the file multicast session begins. Optionally, acknowledgements are transmitted only after the data transmission sessions. In some embodiments of the invention, users that are sure they want to receive the data file can configure their mobile station to forego receiving the preview.

In some embodiments of the invention, mobile stations 20 that need supplementary packets for the preview contact data server 42 and receive the data packets on a unicast connection. Alternatively, supplementary packets for the preview are transmitted during the file multicast session. In this alternative, mobile stations that did not receive a sufficient number of packets during the preview session, and therefore could not view the preview, begin receiving the file during the file multicast session, in case the user will decide to receive the file when the preview is viewed. If the preview is reconstructed during the file multicast session and the user decides not to receive the file, the mobile station is instructed to stop receiving the file. Optionally, the user configures the mobile station as to whether it waits for viewing the preview until the file multicast session or requests supplementary preview packets on a unicast connection. It is noted that in these embodiments mobile stations that request supplementary preview packets and request the keys for the data file will establish two unicast connections in receiving the multicast data file.

Figure 4:
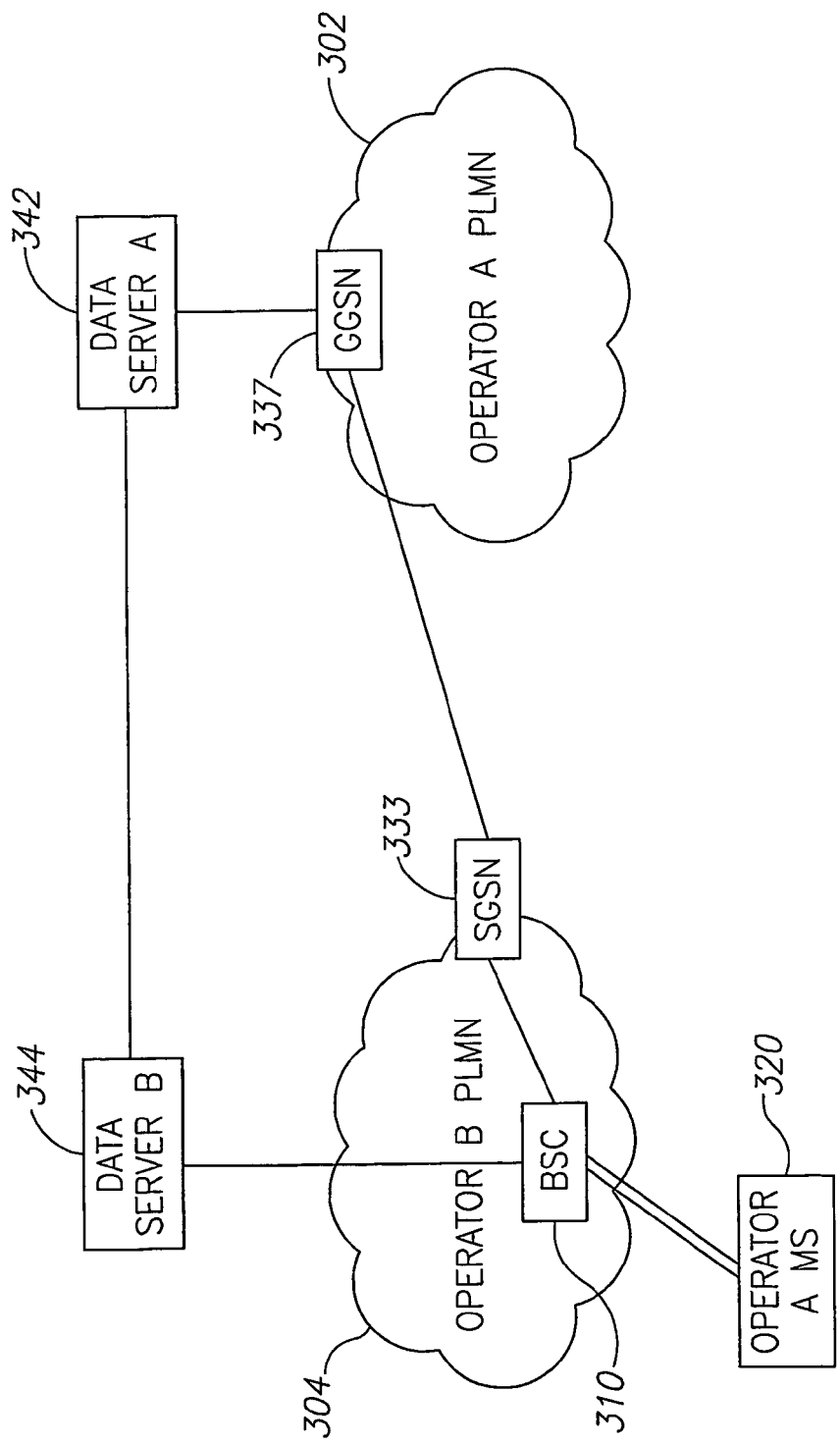
FIG. 4 is a schematic illustration of first and second public land mobile networks (PLMNs), useful in explaining cooperation between networks in providing multicast data, in accordance with an exemplary embodiment of the invention.

FIG. 4 is a schematic illustration of first and second public land mobile networks (PLMNs), useful in explaining cooperation between networks in providing multicast data, in accordance with an exemplary embodiment of the invention. A mobile station 320 registered for service by a PLMN A 302 is currently in a district not serviced by PLMN A, but is serviced by PLMN B 304, which has a cooperation agreement with PLMN A. PLMN B 304 delivers multicast data to subscribing users, for example using methods described above. The delivered multicast data is optionally encrypted and users pay for the decryption keys.

Generally, as is known in the art, when mobile station 320 enters the area covered by PLMN B 304, the mobile station registers with PLMN B such that it exchanges periodic servicing signals with a BSC 310 of PLMN B or with other control units of PLMN B. PLMN B notifies PLMN A that mobile station 320 is serviced by PLMN B. Unicast data connections initiated by mobile station 320 are generally tunneled to PLMN A 302 which services the data connections. Telephone calls directed to mobile station 320 are received by PLMN A which forwards the calls to PLMN B. Telephone calls generated by mobile station 320 are generally directed through PLMN B.

In some embodiments of the invention, when PLMN B provides a multicast file, mobile station 320 receives the notification packet on the upcoming multicast and determines whether to receive the multicast file. The decision is optionally performed without communicating with PLMN B at all or using only link layer communication with PLMN B. If mobile station 320 is instructed by the user to receive the file, the mobile station tunes onto the multicast channel and receives the packets of the file. The multicast data is provided from a data server 344 of PLMN B through BSC 310. Optionally, PLMN B does not know whether mobile station 320 received the multicast data and therefore cannot, for example, generate a charge data record (CDR) for the mobile station 320.

Thereafter, mobile station 320 contacts a data server 342 of PLMN A to request supplementary data, if necessary, and deciphering keys. The contact with data server 342 is optionally performed through an SGSN 333 of PLMN B and a GGSN 337 of PLMN A. Data server 342 of PLMN A requests the keys and supplementary data from data server 344 of PLMN B and provides the keys back to mobile station 320. If unicast delivery is required, e.g., mobile station 320 is subscribed to receive the file but did not receive the notification, the unicast delivery is performed by data server 342 of PLMN A. Optionally, a data server of PLMN A authorizes and charges mobile station 320 for the data file.

Alternatively to providing the multicast data in a different cellular network, the multicast data may be provided on a totally different type of network, such as on a terrestrial network (e.g., a digital video broadcast terrestrial (DVB-T) network), or a satellite broadcast channel (e.g., a digital video broadcast satellite (DVB-S) network or any other digital broadcast satellite (DBS) network). Further alternatively, the multicast data is provided in a cellular network, while the supplementary data and/or keys are provided in a different type of network, for example on a wireless local area network (WLAN). In some embodiments of the invention, the acknowledgement, keys and/or supplementary data may be provided on a plurality of networks. Optionally, the receiver attempts to respond on the network with the most local coverage, e.g., a wireless LAN network. If the transmission on the most local network is not successful, the receiver attempts to respond on a network with a greater coverage, e.g., a cellular network. If the transmission on the cellular network is not successful, an attempt to respond is made on a terrestrial or satellite network, for example on a satellite uplink ALOHA channel.

In some embodiments of the invention, PLMN A provides the same multicast data at substantially the same time as the data is provided by PLMN B. In this embodiment, PLMN A does not need to contact PLMN B for supplementary data. PLMN A may, however, need to request the encryption keys from PLMN B. Alternatively, PLMN A does not provide the data at the same time as PLMN B. Optionally, PLMN B provides supplementary data upon request from PLMN A. Alternatively, for example when many supplementary data requests are expected, PLMN B provides all the data to PLMN A in parallel to transmitting the multicast data. In some embodiments of the invention, supplementary data received by PLMN A is cached for further use for a predetermined time in which additional requests may be received.

In some embodiments of the invention, contacting data server 342 of PLMN A by mobile station 320 includes establishing a data channel. Establishing the data channel optionally includes receiving an IP address and/or a packet data context. The packet data context optionally includes setting a QoS for the data channel.

In some embodiments of the invention, each PLMN advertises a unique ID of the PLMN in the control signals it transmits. Different PLMNs optionally communicate with each other through gateways that are used for security.

It will be appreciated that the above described methods may be varied in many ways, including, changing the order of steps, and the exact implementation used. The methods of the present invention may be performed in various protocol layers and may be performed for a single transmission system in a plurality of communication protocol layers. It should also be appreciated that the above described methods and apparatus are to be interpreted as including apparatus for carrying out the methods and methods of using the apparatus.

The present invention has been described using non-limiting detailed descriptions of embodiments thereof that are provided by way of example and are not intended to limit the scope of the invention. For example, in some embodiments of the invention, mobile stations are required to acknowledge the notification packet and unicast notifications are transmitted to non-acknowledging mobile stations.

It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art.

It is noted that some of the above described embodiments may describe the best mode contemplated by the inventors and therefore may include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims. When used in the following claims, the terms "comprise", "include", "have" and their conjugates mean "including but not limited to".

The invention claimed is:

1. A method of receiving a data file provided in a multicast transmission, comprising:
   tuning, by a mobile station, onto a multicast channel;
   receiving at least one encrypted packet which can be used in reconstructing the data file, on the multicast channel; and
   receiving at least one key required for decrypting the at least one packet after receiving a sufficient number of packets for reconstructing the data file,
   wherein the file includes a plurality of different portions requiring different keys for decryption and wherein the keys required for at least one portion are received after displaying at least one other portion.

2. A method according to claim 1, comprising requesting the at least one key after receiving a sufficient number of packets for reconstructing the data file and wherein receiving the at least one key is performed responsive to the requesting.

3. A method according to claim 1, wherein the file includes a plurality of different video portions requiring different keys for decryption and wherein the keys required for at least one video portion are received after displaying at least one other video portion.

4. A method according to claim 1, wherein tuning onto the multicast channel is performed responsive to receiving a notification on an upcoming multicast transmission and responsive to a determination that the upcoming multicast transmission matches a subscription profile of the receiver.

5. A method according to claim 1, comprising acknowledging receipt of the at least one key, in a manner which allows charging for the data file.

6. A method according to claim 2, wherein the requesting of the at least one key is performed responsive to a user instruction.

7. A method according to claim 4, wherein the determination that the upcoming multicast transmission matches a subscription profile of the receiver comprises consulting a multicast subscription profile stored on the receiver.

8. A method according to claim 6, wherein at least a portion of the data file is not encrypted and the user instruction is received after displaying the non-encrypted portion of the file to the user.

9. A method according to claim 8, wherein the non-encrypted portion of the file is received before any encrypted portion of the data file.

10. A method of multicasting a file, comprising:
    encrypting the file using one or more keys;
    transmitting the encrypted file to a plurality of receivers in a multicast transmission;
    providing at least one of the plurality of receivers with one or more decryption keys required for decrypting the transmitted encrypted file, after the file was transmitted; and
    providing at least one of the receivers with at least one decryption key for the encrypted file, before transmitting the encrypted file, wherein the at least one of the receivers provided with the decryption keys before transmitting the encrypted file are selected at least partially responsive to previous behavior of the receivers.

11. A method according to claim 10, comprising receiving from the at least one receivers provided with the decryption keys before transmitting the encrypted file, acknowledgement messages.

12. A method according to claim 10, wherein the at least one of the receivers provided with the decryption keys before transmitting the encrypted file are selected at least partially responsive to the number or percentage of acknowledgements provided by the receivers in a given period.

13. A method according to claim 11, wherein the acknowledgement messages are received at least 10 minutes after the transmission of the encrypted file is completed.

14. A method of transmitting multicast data, comprising:
providing a data file for transmission;
estimating one or more transmission parameter values required to achieve, on the average, a reception rate which allows less than 100% of the receivers to which the multicast data is directed to reconstruct the data file from the multicast transmission;
transmitting the multicast data representing the data file on a multicast channel, using the one or more estimated parameter values; and
providing at least supplementary portions of the data to receivers that were not able to reconstruct the data file in its entirety from the multicast data transmitted on the multicast channel.

15. A method according to claim 14, wherein providing at least supplementary portions comprises transmitting the supplementary portions over a unicast connection.

16. A method according to claim 14, wherein the one or more transmission parameters comprise a transmission power level.

17. A method according to claim 14, wherein the one or more transmission parameters comprise a FEC redundancy level.

18. A method according to claim 14, wherein estimating the one or more transmission parameter values comprises estimating based on general network data without relation to specific conditions of a current transmission.

19. A method according to claim 14, wherein estimating the one or more transmission parameter values comprises estimating based on specific conditions of a current transmission.

20. A method according to claim 14, wherein the multicast channel comprises a data channel of a cellular network.

21. A method according to claim 19, wherein estimating the one or more transmission parameter values comprises estimating based on the number of receivers.

22. A method of transmitting multicast data in a cellular network, comprising:
providing data for multicast transmission to a plurality of base stations having different bandwidth amounts for multicast transmission, at a same rate;
dropping data by one or more of the base stations, as required, so that the data can be transmitted by each of the base stations on its respective allocated bandwidth for multicast transmission; and
transmitting the non-dropped data such that the data is transmitted by all the base stations substantially synchronously.

23. A method according to claim 22, wherein the base stations use a small buffer, having room for at most five packets, for the provided multicast data.

24. A method according to claim 22, wherein providing the data comprises providing data protected with a forward error correction code.

25. A method according to claim 22, comprising transmitting supplementary data to receivers that request data they did not receive in the multicast transmission over point-to-point connections.

26. A method according to claim 22, wherein providing the data comprises providing data encoded according to a FEC code.

* * * * *